US009752926B2

(12) United States Patent
Choi et al.

(10) Patent No.: US 9,752,926 B2
(45) Date of Patent: Sep. 5, 2017

(54) SCANNING MODULE, DETECTION DEVICE USING BESSEL BEAM, DETECTION PROBE, AND PROBE TYPE DETECTION DEVICE

(71) Applicant: KOREA FOOD RESEARCH INSTITUTE, Bundang-gu, Seongnam-si, Gyeonggi-do (KR)

(72) Inventors: Sung Wook Choi, Yongin-si (KR); Hyun Jung Kim, Seoul (KR); Na Ri Lee, Seoul (KR); Hyun Joo Chang, Seoul (KR); Gyeong Sik Ok, Osan-si (KR)

(73) Assignee: Korea Food Research Institute, Bundang-gu, Seongnam- (KR)

( * ) Notice: Subject to any disclaimer, the term of this patent is extended or adjusted under 35 U.S.C. 154(b) by 36 days.

(21) Appl. No.: 14/787,780

(22) PCT Filed: Dec. 18, 2013

(86) PCT No.: PCT/KR2013/011798
§ 371 (c)(1),
(2) Date: Oct. 29, 2015

(87) PCT Pub. No.: WO2014/178514
PCT Pub. Date: Nov. 6, 2014

(65) Prior Publication Data
US 2016/0084701 A1  Mar. 24, 2016

(30) Foreign Application Priority Data

Apr. 29, 2013  (KR) ........................ 10-2013-0047349
Jul. 19, 2013  (KR) ........................ 10-2013-0085132

(51) Int. Cl.
*G01J 1/08* (2006.01)
*G01J 1/42* (2006.01)
(Continued)

(52) U.S. Cl.
CPC . *G01J 1/08* (2013.01); *G01J 1/42* (2013.01); *G02B 5/001* (2013.01); *G02B 26/105* (2013.01)

(58) Field of Classification Search
CPC .. G01J 1/08; G01J 1/42; G02B 26/105; G02B 5/001
See application file for complete search history.

(56) References Cited

U.S. PATENT DOCUMENTS

2006/0033987 A1* 2/2006 Stelzer ................... G02B 21/06
359/385
2008/0243002 A1* 10/2008 Munce ................. A61B 5/0062
600/459
(Continued)

FOREIGN PATENT DOCUMENTS

JP  08015156 A  *  1/1996
JP  H8-15156 A  1/1996
(Continued)

OTHER PUBLICATIONS

International Search Report Corresponding to PCT/KR2013/011798 mailed Mar. 10, 2014.
(Continued)

*Primary Examiner* — Mark R Gaworecki
(74) *Attorney, Agent, or Firm* — Davis & Bujold PLLC; Michael J. Bujold

(57) ABSTRACT

A scanning module including first path shifting unit changing a path of an incident electromagnetic wave from a light source; a first driving unit adjusting the path of the electromagnetic wave by moving the first path shifting unit; and a Bessel beam generating unit making a Bessel beam on a portion of an object, using the electromagnetic wave with the path changed by the path shifting unit. A detection probe which includes a light source generating an electromagnetic wave; a path shifting unit changing a path of an electromagnetic wave from a light source; a Bessel beam generating unit making a Bessel beam on a portion of an object, using the electromagnetic wave with the path changed by the
(Continued)

path shifting unit; a detecting unit detecting intensity of a wave from the object, and a housing accommodating the light source, path shifting unit, Bessel beam generating unit, and detecting unit.

26 Claims, 18 Drawing Sheets

(51) Int. Cl.
*G02B 5/00* (2006.01)
*G02B 26/10* (2006.01)

(56) References Cited

U.S. PATENT DOCUMENTS

| | | |
|---|---|---|
| 2011/0174986 A1 | 7/2011 | Kempe et al. |
| 2011/0218403 A1* | 9/2011 | Tearney ............... A61B 5/0066 600/165 |
| 2012/0085928 A1 | 4/2012 | Jung et al. |

FOREIGN PATENT DOCUMENTS

| | | |
|---|---|---|
| JP | 2001-41906 A | 2/2001 |
| KR | 1020010017027 | 3/2001 |
| KR | 10-2011-0095735 A | 8/2011 |
| KR | 10-2012-0036230 A | 4/2012 |
| KR | 1020130004633 | 1/2013 |

OTHER PUBLICATIONS

Korean Office Action issued in corresponding Korean Patent Application No. 10-2013-0047349 dated May 4, 2016.
Korean Office Action issued in corresponding Korean Patent Application No. 10-2013-0085132 dated Jun. 8, 2016.

\* cited by examiner

SCANNING MODULE, DETECTION DEVICE USING BESSEL BEAM, DETECTION PROBE, AND PROBE TYPE DETECTION DEVICE

BACKGROUND OF THE INVENTION

Field of the Invention

An imaging method is generally used to nondestructively examine objects or substances and is largely classified into two types of an image detection type using a monochromatic light and an image detection type using a spectroscopic method. These types have advantages and disadvantages, but the image detection type using a monochromatic light is much used for a case requiring relatively high intensity such as a transmission image.

Description of the Related Art

In general, the higher the resolution, the lower the DOF (Depth of Focus), so these techniques still have limits.

In particular, an optical system with high resolution has a small DOF, so it is required to scan a focal point in a depth direction of an object in order to examine the internal structure of an object having a predetermined volume in a nondestructive way. This problem takes more time to make 3D CT (Computerized Tomography) on the basis of a projection absorber image, when such depth-directional scanning is not performed, a projection image with very low accuracy is made and the quality of the image is deteriorated.

Further, the smaller the focal distance, the higher the detection resolution, and the distance between an object and a lens should be small to improve the resolution. Accordingly, a working distance is considerably limited.

These problems can be overcome using a Bessel beam known as a non-diffracting beam proposed by Durnin and the Bessel beam has been known are being able to increase the DOF and improve resolution (available under a wavelength) in an optical system.

On the other hand, for acquiring an image in a focal plane in real time, a method of acquiring an image by directly using a focal plane array detector or a method of acquiring an image by combining a linear array detector or a single point detector with a scanning unit has been known.

In particular, among these methods, a method that can achieve highly sensitive detection at a low cost with high radiation intensity per unit area is a method that focuses an electromagnetic wave to one point and detects an electromagnetic wave reflecting from or passing through a specimen while changing the travel direction of the electromagnetic wave with a single detector, using high-speed raster scanning (polygon mirror, galvano mirror, and the like) at a high speed, in order to efficiently use the energy of an incident electromagnetic wave.

However, most electromagnetic beams used in the high-speed raster scanning are focused in the type of a Gaussian beam, so there are many limits in improvement of resolution and DOF, as described above.

SUMMARY OF THE INVENTION

An object of the present invention provides a technique that can perform high-speed raster scanning, using a Bessel beam that can increase a working distance with high spatial resolution and a large DOF (Depth Of Focus) simultaneously in order to achieve accurate images of various objects in a nondestructive way.

Other objects and advantages of the present invention can be understood from the following description and will be made of clear by embodiments of the present invention. Further, it can be easily understood that the objects and advantages of the present invention can be achieved by the components described in claims and combinations of the components.

Another object of the present invention is to provide a technique that can perform scanning, using a Bessel beam that can increase a working distance with high spatial resolution and a large DOF (Depth Of Focus) simultaneously.

Alternatively, another object of the present invention is to provide a technique that performs scanning while making rotation in order to more effectively scan a cylindrical object.

Other objects and advantages of the present invention can be understood from the following description and will be made of clear by embodiments of the present invention. Further, it can be easily understood that the objects and advantages of the present invention can be achieved by the components described in claims and combinations of the components.

An imaging method is generally used to nondestructively examine objects or substances and is largely classified into two types of an image detection type using a monochromatic light source and an image detection type using a spectroscopic method. These types have advantages and disadvantages, but the image detection type using monochromatic light is much used for a case requiring relatively high intensity such as a transmission image.

In general, the higher the resolution, the lower the DOF (Depth of Focus), so these techniques still have limits.

In particular, an optical system with high resolution has a small DOF, so it is required to scan a focal point in a depth direction of an object in order to examine the internal structure of an object having a predetermined volume in a nondestructive way. This problem takes more time to make 3D CT (Computerized Tomography) on the basis of a projection absorber image, when such depth-directional scanning is not performed, a projection image with very low accuracy is made and the quality of the image is deteriorated.

Further, the smaller the focal distance, the higher the detection resolution, and the distance between an object and a lens should be small to improve the resolution. Accordingly, a working distance is considerably limited.

On the other hand, for acquiring an image in a focal plane in real time, a method of acquiring an image by directly using a focal plane array detector or a method of acquiring an image by combining a linear array detector or a single point detector with a scanning unit has been known.

In particular, among these methods, a method that can achieve highly sensitive detection at a low cost with high radiation intensity per unit area is a method that focuses an electromagnetic wave to one point and detects an electromagnetic wave reflecting from or passing through a specimen while changing the travel direction of the electromagnetic wave with a single detector, using raster scanning (polygon mirror, galvano mirror, and the like) at a high speed, in order to efficiently use the energy of an incident electromagnetic wave.

However, most electromagnetic beams used in the high-speed raster scanning are focused in the type of a Gaussian beam, so there are many limits in improvement of resolution and DOF, as described above.

A scanning module relating to an embodiment of the present invention includes: a first path shifting unit changing the path of an incident electromagnetic wave; a first driving unit adjusting the path of the electromagnetic wave by moving the first path shifting unit; and a Bessel beam generating unit making a Bessel beam at least on a portion of an object, using the electromagnetic wave with the path changed by the first path shifting unit.

The first path shifting unit and the Bessel beam generating unit may be mechanically combined, and the Bessel beam generating unit may move with the first path shifting unit, when the first path shifting unit is moved by the first driving unit.

The first path shifting unit and the Bessel beam generating unit may be spaced from each other, and the scanning module may further include a second driving unit moving the Bessel beam generating unit so that an electromagnetic wave from the first path shifting unit travels into the Bessel beam generating unit when the first path shifting unit is moved by the first driving unit.

The scanning module may further include: a second path shifting unit disposed between the Bessel beam generating unit and the object, and changing the path of the Bessel beam so that the Bessel beam is formed at least on a portion of the object; and a third driving unit adjusting the path of the Bessel beam by moving the second path shifting unit.

The first path shifting unit may include: a body moved by the first driving unit; a first reflecting unit changing the path of an electromagnetic wave from a light source; and a fourth driving unit connected to the body at a side and to the first reflecting unit at the other side, and adjusting the path of an electromagnetic wave by moving the first reflecting unit.

The scanning module may further include an electromagnetic wave adjusting unit being a collimating unit parallelizing electromagnetic waves from a light source and sending the parallelized electromagnetic waves into the first path shifting unit.

The scanning module may further include an electromagnetic wave adjusting unit including a collimating unit parallelizing electromagnetic waves from a light source and a second reflecting unit reflecting the parallelized electromagnetic waves into the first path shifting unit.

The scanning module may further include an electromagnetic wave adjusting unit including: a collimating unit parallelizing electromagnetic waves from a light source; and a variable optical element moving between the collimating unit and the first path shifting unit and sending the parallelized electromagnetic waves into the first path shifting unit.

The scanning module may include a fifth driving unit moving the variable optical element between the collimating unit and the first path shifting unit.

The scanning module may further include: an electromagnetic wave adjusting unit including: a collimating unit parallelizing electromagnetic waves from a light source; a second reflecting unit reflecting the parallelized electromagnetic waves; and a variable optical element moving between the second reflecting unit and the first path shifting unit and sending the reflecting electromagnetic wave into the first path shifting unit.

The Bessel beam generating unit may be composed of a diffractive optical element having a plurality of circular grooves or circular hole, and a lens having a positive refractive index, or may be an axicon lens or a hologram optical element.

The distance between the first path shifting unit and the Bessel beam generating unit may be adjustable.

A detection device using a Bessel beam according to another embodiment of the present invention includes: a first path shifting unit changing the path of an incident electromagnetic wave; a first driving unit adjusting the path of the electromagnetic wave by moving the first path shifting unit; a Bessel beam generating unit making a Bessel beam at least on a portion of an object, using the electromagnetic wave with the path changed by the first path shifting unit; and a detecting unit detecting the intensity of an electromagnetic wave from the object.

The detection device using a Bessel beam may further include a beam splitter reflecting an electromagnetic wave, which is reflected from the object and travels through the Bessel beam generating unit and the first path shifting unit, to the detecting unit, in which the detecting unit may detect the intensity of an electromagnetic wave from the beam splitter.

The detection device using a Bessel beam may further include a focusing unit condensing electromagnetic waves diverging through the object, in which the detecting unit may detect the intensity of electromagnetic waves condensed by the focusing unit.

The focusing unit may have a diameter equal to or larger than the diameter of an electromagnetic wave diverging through the object.

The first path shifting unit and the Bessel beam generating unit may be mechanically combined, and the Bessel beam generating unit may move with the first path shifting unit, when the first path shifting unit is moved by the first driving unit.

The first path shifting unit and the Bessel beam generating unit may be spaced from each other, and the detection device using a Bessel beam may further include a second driving unit moving the Bessel beam generating unit so that an electromagnetic wave from the first path shifting unit travels into the Bessel beam generating unit when the first path shifting unit is moved by the first driving unit.

The detection device using a Bessel beam may further include an electromagnetic wave adjusting unit including: a collimating unit parallelizing electromagnetic waves from a light source; and a variable optical element moving between the collimating unit and the first path shifting unit and sending the parallelized electromagnetic waves into the first path shifting unit.

A detection probe relating to an embodiment of the present invention includes: a light source generating an electromagnetic wave; a path shifting unit changing the path of an electromagnetic wave from the light source; a Bessel beam generating unit making a Bessel beam at least on a portion of an object, using the electromagnetic wave with the path changed by the path shifting unit; a detecting unit detecting the intensity of an electromagnetic wave from the object, and a housing accommodating the light source, the path shifting unit, the Bessel beam generating unit, and the detecting unit.

The detection probe may further include: a waveguide disposed between the light source and the path shifting unit; a coupling lens sending an electromagnetic wave from the light source into the waveguide; and a focusing lens condensing electromagnetic waves discharged from the waveguide to the path shifting unit.

The detection probe may further include a path shifting driving unit rotating or moving straight the path shifting unit.

The path shifting unit and the Bessel beam generating unit may be mechanically combined, and the Bessel beam generating unit may move with the path shifting unit when the path shifting unit is moved by the path shifting driving unit.

A probe type detection device according to another embodiment of the present invention includes: a detection probe including a light source generating an electromagnetic wave, a path shifting unit changing a path so that an electromagnetic wave from the light source is radiated to an object, a path shifting driving unit rotating the path shifting unit, a detecting unit detecting the intensity of an electromagnetic wave from the object, and a housing accommodating the light source, the path shifting unit, the path shifting driving unit, and the detecting unit; and a straight driving unit moving straight the detection probe.

The detection probe may further include a Bessel beam generating unit making a Bessel beam at least on a portion of the object, using an electromagnetic wave with the path changed by the path shifting unit.

The detection probe may further include: a waveguide disposed between the light source and the path shifting unit; a coupling lens sending an electromagnetic wave from the light source into the waveguide; and a focusing lens condensing electromagnetic waves discharged from the waveguide to the path shifting unit.

The path shifting unit and the Bessel beam generating unit may be mechanically combined, and the Bessel beam generating unit may move with the path shifting unit when the path shifting unit is moved by the path shifting driving unit.

A probe type detection device according to another embodiment of the present invention includes: a light source generating an electromagnetic wave; a first housing accommodating a detecting unit detecting the intensity of an electromagnetic wave from an object; a path shifting unit changing a path so that an electromagnetic wave from the light source is radiated to the object; and a second housing accommodating a path shifting driving unit rotating the path shifting unit, in which the first housing has a groove for receiving the second housing, rotary members are disposed at both sides of the groove so that the second housing received in the groove is rotated, and the second housing includes a detection probe including coupling portions coupled to the rotary members and a straight driving unit moving straight the detection probe.

According to the present invention, since a Bessel beam is used to detect images, resolution is improved and a long DOF is ensured, so the working distance can be increased and the detection performance can be improved.

Further, since a DOF is long, it is possible to acquire a clear projection image of an absorber or a reflector in an object, using a projection method, when the object is positioned within the DOF.

Further, since the DOF is long, the present invention can be useful for detecting substances or objects in objects that absorbs less electromagnetic wave and has large volume or depth.

According to the present invention, since Bessel beams are used, resolution is improved and a long DOF is ensured, so the working distance can be increased and the detection performance can be improved.

Further, since it is possible to perform scanning while rotating, the present invention can be more useful for cylindrical objects.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, embodiments of the present invention will be described in detail with reference to the accompanying drawings.

Figure 1:
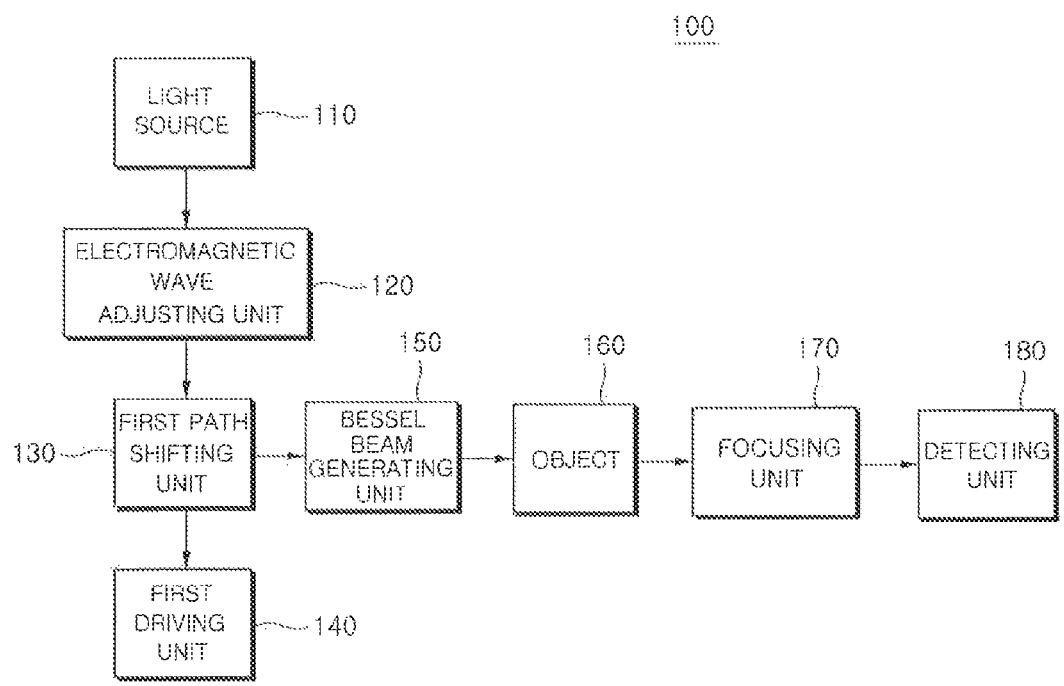
FIG. 1 is a block diagram illustrating a detection device using a Bessel beam relating to an embodiment of the present invention.

FIG. 1 is a block diagram illustrating a detection device using a Bessel beam relating to an embodiment of the present invention.

Referring to FIG. 1, a detection device 100 using a Bessel beam includes a light source 110, an electromagnetic wave adjusting unit 120, a first path shifting unit 130, a first driving unit 140, a Bessel beam generating unit 150, a object 160, a focusing unit 170, and a detecting unit 180.

A Bessel beam is an electromagnetic wave given as a zeroth-order Bessel function of the first kind in a solution set of Maxwell equation about a free space and has been known as a non-diffractive beam. The Bessel beam was first introduced by Durnin in 1987 and has axial asymmetry, in which energy is concentrated as much as a predetermined length about an axis in the shape of a needle. Since it is implemented by an optical system having not an infinite aperture, but a limited aperture, there is no Bessel beam that infinitely travels, so it is also usually called QBB (Quasi-Bessel-Beam). The QBB is made by a hologram, a combination of a lens and a circular lens composed of a plurality of rings or limited apertures, or by a conical lens known as an axicon.

In the following description, a scanning module means a device including only some components of a detecting device using a Bessel beam.

The light source 110 may be various devices that can generate an electromagnetic wave. For example, the light source 110 can generate a millimeter wave or terahertz wave. The millimeter wave is an electromagnetic wave at an extremely high frequency and may have a frequency from 30 GHz to 300 GHz. The terahertz wave means an electromagnetic wave in a terahertz range and may have a frequency of 0.1 THz to 10 THz. However, even if the terahertz wave comes out of the range, it can be considered as a terahertz wave used in the present invention when its range can be easily inferred by those skilled in the art.

The electromagnetic wave adjusting unit 120 may be disposed between the light source 110 and the first path shifting unit 130. The electromagnetic wave adjusting unit 120 can collimate, converge, or diverge an electromagnetic wave from the light source 110. Converging means a case in which the area of an electromagnetic wave decreases as compared with the area of an electromagnetic wave traveling into the first path shifting unit 130 after collimating. Diverging means a case in which the area of an electromagnetic wave increases as compared with the area of an electromagnetic wave traveling into the first path shifting unit 130 after collimating.

As for the collimating, for example, the electromagnetic wave adjusting unit 120 may include a collimating unit that parallelizes electromagnetic waves from the light source 110 and sends the parallelized electromagnetic waves to the first path shifting unit 130. For example, the collimating unit may be a convex lens refracting incident electromagnetic waves in parallel or a parabolic mirror reflecting incident electromagnetic waves in parallel.

As another example of the collimating, the electromagnetic wave adjusting unit 120 may include a collimating unit that parallelizes electromagnetic waves from a light source and a second reflecting unit that reflects the parallelized electromagnetic waves to the first path shifting unit 130.

As for the converging or diverging, the electromagnetic wave adjusting unit 120 may include a collimating unit that parallelizes electromagnetic waves from a light source and a variable optical element that moves between the collimating unit and the first path shifting unit and sends the parallelized electromagnetic waves to the first path shifting unit 130. The electromagnetic wave adjusting unit 120 may further include a fifth driving unit that converges or diverges an electromagnetic wave traveling into the first path shifting unit 130 by moving the variable optical element between the collimating unit and the first path shifting unit 130. When the variable optical element is moved toward the collimating unit, the electromagnetic wave traveling into the first path shifting unit diverges. In this case, the DOF (Depth Of Focus) of a Bessel beam generated by the Bessel beam generating unit 150 increases. In contrast, when the variable optical element is moved toward the first path shifting unit, the electromagnetic wave traveling into the first path shifting unit 130 converges. In this case, the DOF (Depth of Focus) of a Bessel beam generated by the Bessel beam generating unit 150 decreases.

As another example of the converging or diverging, the electromagnetic wave adjusting unit 120 may include a collimating unit that parallelizes electromagnetic waves from the light source 110, a second reflecting unit that reflects the parallelized electromagnetic waves, and a variable optical element that moves between the second reflecting unit and the first path shifting unit and sends the reflected electromagnetic waves to the first path shifting unit 130. The electromagnetic wave adjusting unit 120 may further include a fifth driving unit that converges or diverges an electromagnetic wave traveling into the first path shifting unit 130 by moving the variable optical element between the second reflecting unit and the first path shifting unit.

The electromagnetic wave adjusting unit 120 will be described below in more detail with reference to FIGS. 10a to 12b.

The first path shifting unit 130 can change the path of an electromagnetic wave from the light source 110 (when there is no electromagnetic wave adjusting unit) or the electromagnetic wave adjusting unit 120. The electromagnetic wave with the path changed by the first path shifting unit 130 travels into the Bessel generating unit 150.

For example, the first path shifting unit 130 may include a reflective surface for changing the path of an incident electromagnetic wave. The reflective surface can reflect an incident electromagnetic wave to the Bessel beam generating unit 150.

As another example, the first path shifting unit 130 may include a body that is moved by the first driving unit 140, a first reflecting unit that changes the path of an electromagnetic wave from the light source 110, and a fourth driving unit that is connected to the body at a side and to the reflecting unit at the other side and adjusts the path of an electromagnetic wave by moving the reflecting unit. The fourth driving unit can move the Bessel beam generating unit 150 such that the electromagnetic wave with the path changed by the reflecting unit perpendicularly travels through a light incident surface of the Bessel beam generating unit 150. The light incident surface means a surface through which light travels inside.

The first path shifting unit 130 will be described hereafter in more detail with reference to FIGS. 4a, 4b, 7, and 9.

The first driving unit 140 can adjust the path of an electromagnetic wave by moving the first path shifting unit 130. As the path of the electromagnetic wave is adjusted, the position of the object 160 to which a Bessel beam generated by the Bessel beam generating unit 150 is radiated is changed. Accordingly, the detection device 100 can scan the object 160. For example, the first driving unit 140 can rotate or move straight. Further, the first driving unit 140 can be driven about one axis or two axes. The first driving unit 140 will be described below in more detail with reference to FIGS. 5a to 5c.

The Bessel beam generating unit 150 can generate a Bessel beam to at least a portion of the object 160, using the electromagnetic wave with the path changed by the first path shifting unit 130. However, it is practically difficult to generate an ideal beam, so the Bessel beams generated by the Bessel beam generating unit can be considered as a quasi-Bessel beam (QBB). The configuration of generating a Bessel beam with the Bessel beam generating unit 150 will be described below in more detail with reference to FIG. 3b.

The Bessel beam generating unit 150 may be disposed such that the electromagnetic wave with the path changed by the first path shifting unit 130 perpendicularly travels through the light incident surface of the Bessel beam generating unit 150.

The Bessel beam generating unit 150 may be achieved in various types, for example, being composed of a diffractive optical element having a plurality of circular grooves or circular holes and a lens having a positive refractive index, or being an axicon lens, a hologram optical element, or the like.

As an example of combination and a way of driving the first path shifting unit 130 and the Bessel beam generating unit 150, the first path shifting unit 130 and the Bessel beam generating unit 150 may be mechanically combined. The Bessel beam generating unit 150 can be moved with the first path shifting unit 130, when the first path shifting unit 130 is moved by the first driving unit 140.

As another example, the first path shifting unit 130 and the Bessel beam generating unit 150 are spaced from each other, and there may be further provided a second driving unit that moves the Bessel beam generating unit 150 such that the electromagnetic wave with the path changed by the first path shifting unit 140 travels into the Bessel beam generating unit 150 when the first path shifting unit 130 is moved by the first driving unit 140. For example, the second driving unit can move the Bessel beam generating unit 150 such that the electromagnetic wave with the path changed by the first path shifting unit 140 perpendicularly travels through the light incident surface of the Bessel beam generating unit 150. Accordingly, the electromagnetic wave with the path changed can keep perpendicularly travels through the light incident surface of the Bessel beam generating unit 150.

As another example, the first path shifting unit 130 and the Bessel beam generating unit 150 may be spaced from each other and the distance between the first path shifting unit 130 and the Bessel beam generating unit 150 may be adjusted. For example, a user can manually adjust the position of the Bessel beam generating unit 150 or the second driving unit can automatically adjust the position of the Bessel beam generating unit 150 in response to a control signal.

The object means an object to the examined.

The focusing unit 170 condenses electromagnetic waves reflecting from, passing through, or diffracting from the object 160. For example, beams spread away from the Bessel beam generating unit 150 in a ring shape and the focusing unit 170 condenses the ring-shaped spreading electromagnetic waves such that the condensed electromagnetic waves can travel to the detection unit 180.

For example, the focusing unit may be a convex lens. The convex lens may have an aperture as large as possible and a numerical aperture (NA) as high as possible to condense millimeter waves or terahertz waves as much as possible into an available detection area of a detector. However, the present invention is not limited to the focusing unit that is a convex lens, and the focusing unit may be implemented in various types such as a concave mirror, a parabolic mirror, or an elliptical mirror.

The detection unit 180 can detects intensity of an electromagnetic wave from the object 160. For example, the detection unit 180 can detect the intensity of electromagnetic waves reflecting from, passing through, diffracting from, or dispersed from the object 160.

When the focusing unit 170 is provided, the detection unit 180 can collect and detect electromagnetic waves condensed by the focusing unit 170. For example, the detection unit 180 may include Schottky diode.

The detection unit 180 may collect and detect all of electromagnetic waves condensed by the focusing unit 170 to improve resolution. In other words, the focusing unit 170 may condense all of electromagnetic waves including millimeter waves or terahertz waves within an available area of the detection unit 180.

An image generating unit (not illustrated) can create images using Bessel beams detected by the detection unit 180. The created images can be displayed by a display unit (not illustrated).

Since the detection device using a Bessel beam uses Bessel beams to detect images, resolution is improved and a long DOF is ensured, so the working distance can be increased and the detection performance can be improved.

Further, the detection device using a Bessel beam has a long DOF, so it is possible to acquire a clear projection image of an absorber or a reflector in an object, using a projection method, when the object is positioned within the DOF.

Further, since the detection device has a long DOF, it can be useful for detecting substances or objects in objects that absorbs less electromagnetic waves and has large volume or depth.

Figure 2A:
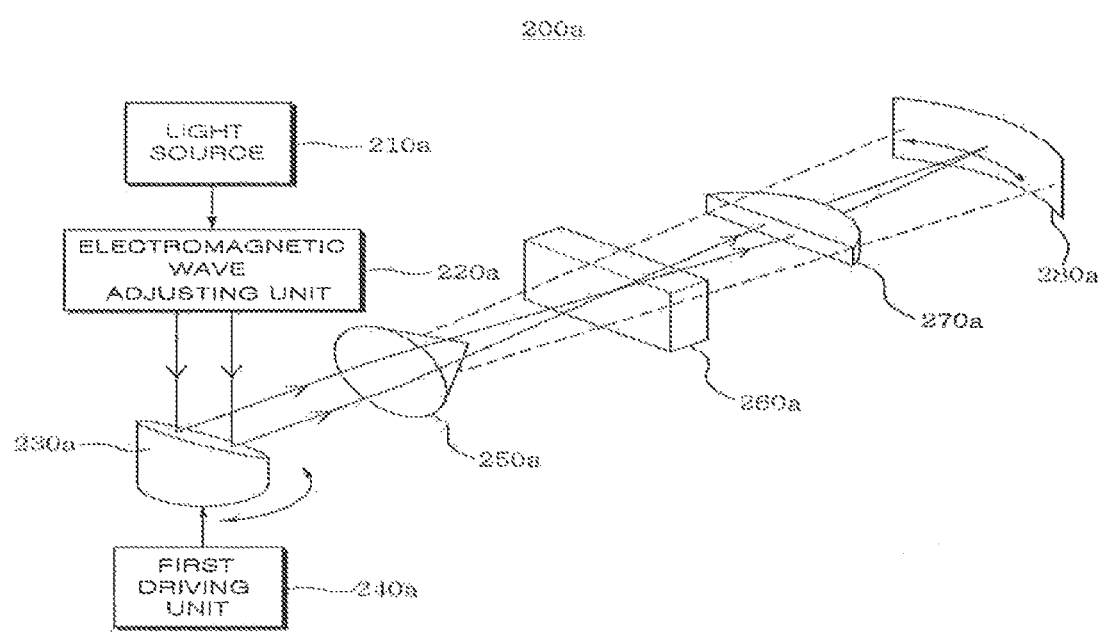
FIGS. 2a and 2b are diagrams illustrating a detection device using a Bessel beam relating to an embodiment of the present invention.
Figure 2B:
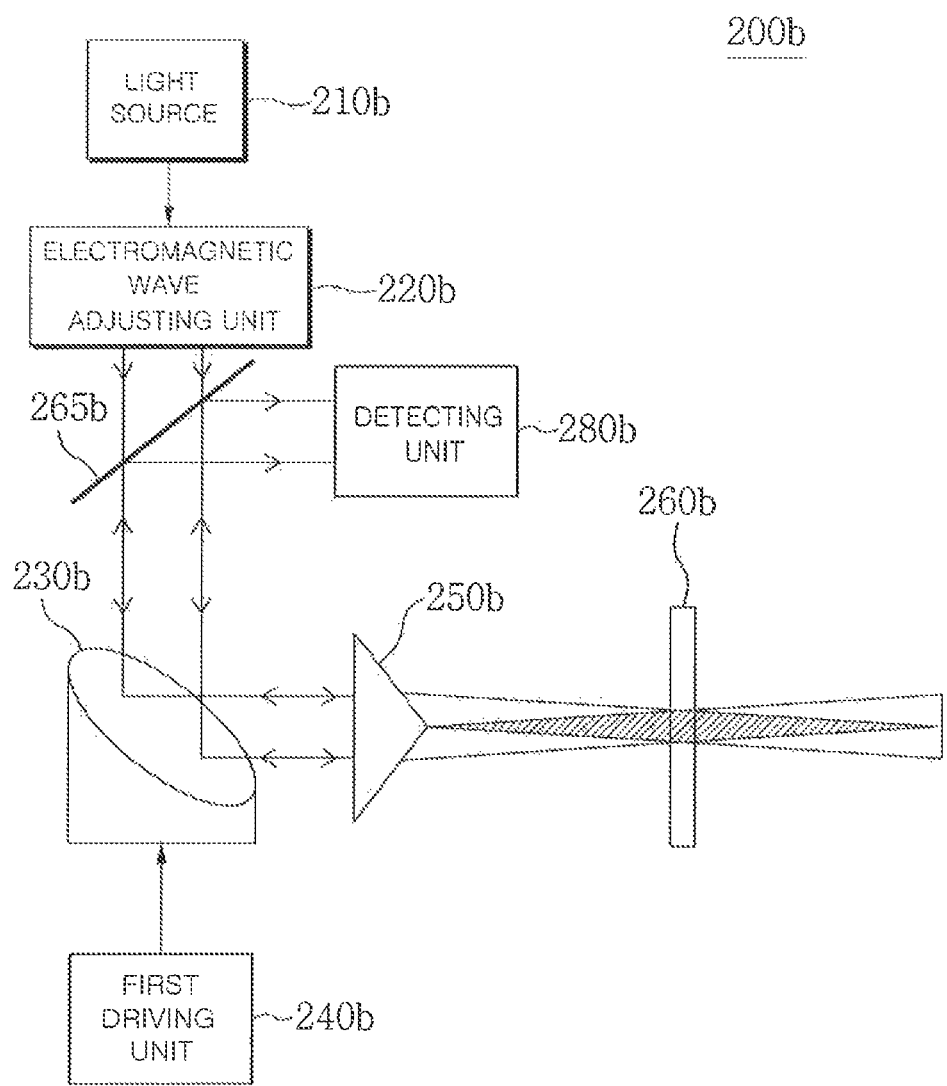

FIGS. 2a and 2b are diagram illustrating a detection device using a Bessel beam relating to an embodiment of the present invention.

FIG. 2a is a diagram illustrating a case when the detection device using a Bessel beam relating to an embodiment of the present invention performs detection using a projection type.

Referring to FIG. 2a, a detection device 200a using a Bessel beam includes a light source 210a, an electromagnetic wave adjusting unit 220a, a first path shifting unit 230a, a first driving unit 240a, a Bessel beam generating unit 250a, an object 260a, a focusing unit 270a, and a detecting unit 280a.

The light source 210a may be various devices that can generate an electromagnetic wave.

The electromagnetic wave adjusting unit 220a may be disposed between the light source 210a and the first path shifting unit 230a. The electromagnetic wave adjusting unit 220a can collimate, converge, or diverge an electromagnetic wave from the light source 210a. Converging means a case in which the area of an electromagnetic wave decreases as compared with the area of an electromagnetic wave traveling into the first path shifting unit 230a after collimating. Diverging means a case in which the area of an electromagnet wave increases as compared with the area of an electromagnetic wave traveling into the first path shifting unit 230a after collimating.

The first path shifting unit 230a can change the path of an electromagnetic wave from the electromagnetic wave adjusting unit 220a. The electromagnetic wave with the path changed by the first path shifting unit 230a travels into the Bessel generating unit 250a. For example, the first path shifting unit 230a may include a reflective surface for changing the path of an incident electromagnetic wave. The reflective surface can reflect an incident electromagnetic wave to the Bessel beam generating unit 250a.

The first driving unit 240a can adjust the path of an electromagnetic wave by moving the first path shifting unit 230a. When the first driving unit 240a changes the path of an electromagnetic wave, the position of the object 260a to which a Bessel beam generated by the Bessel generating unit 250a is radiated is changed.

The Bessel beam generating unit 250a can generate a Bessel beam to at least a portion of the object 260a, using the electromagnetic wave with the path changed by the first path shifting unit 230a. In this embodiment, an axicon lens is exemplified as the Bessel beam generating unit 250a.

The object 260a is positioned in a range (Zmax section in FIG. 3b) where Bessel beams are generated between the Bessel beam generating unit 250a and the focusing unit 270a.

The focusing unit 270a condenses electromagnetic waves diverging through the object 260a. For example, the focusing unit 270a may be a convex lens or an F-theta lens. The convex lens may have an aperture as large as possible and a numerical aperture (NA) as high as possible to condense electromagnetic waves as much as possible into an available detection area of a detector. However, the present invention is not limited to the focusing unit that is a convex lens, and the focusing unit may be implemented in various types such as a concave mirror.

The detecting unit 280a may be one detection device or may be an array including a plurality of detection devices and detects the intensity of electromagnetic waves condensed by the focusing unit 270a.

FIG. 2b is a diagram illustrating a case when the detection device using a Bessel beam relating to an embodiment of the present invention performs detection using a reflection type.

Referring to FIG. 2b, a detection device 200b using a Bessel beam includes a light source 210b, an electromagnetic wave adjusting unit 220b, a first path shifting unit 230b, a first driving unit 240b, a Bessel beam generating unit 250b, an object 260b, a beam splitter 265b, and a detecting unit 280b.

The light source 210b may be various devices that can generate an electromagnetic wave.

The electromagnetic wave adjusting unit 220b may be disposed between the light source 210b and the first path shifting unit 230b. The electromagnetic wave adjusting unit 220b can collimate, converge, or diverge an electromagnetic wave from the light source 210b. Converging means a case in which the area of an electromagnetic wave decreases as compared with the area of an electromagnetic wave traveling into the first path shifting unit 230b after collimating. Diverging means a case in which the area of an electromagnetic wave increases as compared with the area of an electromagnetic wave traveling into the first path shifting unit 230b after collimating.

The first path shifting unit 230b can change the path of an electromagnetic wave from the electromagnetic wave adjusting unit 220b. The electromagnetic wave with the path changed by the first path shifting unit 230b travels into the Bessel generating unit 250b. For example, the first path shifting unit 230b may include a reflective surface for changing the path of an incident electromagnetic wave. The reflective surface can reflects an incident electromagnetic wave to the Bessel beam generating unit 250b.

The first driving unit 240b can adjust the path of an electromagnetic wave by moving the first path shifting unit 230b. When the first driving unit 240b changes the path of an electromagnetic wave, the position of the object 260b to which a Bessel beam generated by the Bessel generating unit 250b is radiated is changed.

The Bessel beam generating unit 250b can generate a Bessel beam to at least a portion of the object 260b, using the electromagnetic wave with the path changed by the first path shifting unit 230b. In this embodiment, an axicon lens is exemplified as the Bessel beam generating unit 250b.

The object 260b is positioned in a range (Zmax section in FIG. 3b) where Bessel beams are generated between the Bessel beam generating unit 250b and the focusing unit 270b.

The beam splitter 265b can send an electromagnetic wave from the electromagnetic wave adjusting unit 220b into the first path shifting unit 230b.

The beam splitter 265b can reflect the electromagnetic wave, which reflects from the object 260b and travels through the Bessel beam generating unit 250b and the first path shifting unit 230b, to the detecting unit 280b. The focusing unit (not illustrated) is disposed between the beam splitter 265b and the detecting unit 280b and can condense electromagnetic waves traveling from the beam splitter 265b and send them to the detecting unit 280b.

The detecting unit 266b detects the intensity of electromagnetic waves from the beam splitter 265b.

Figure 3A:
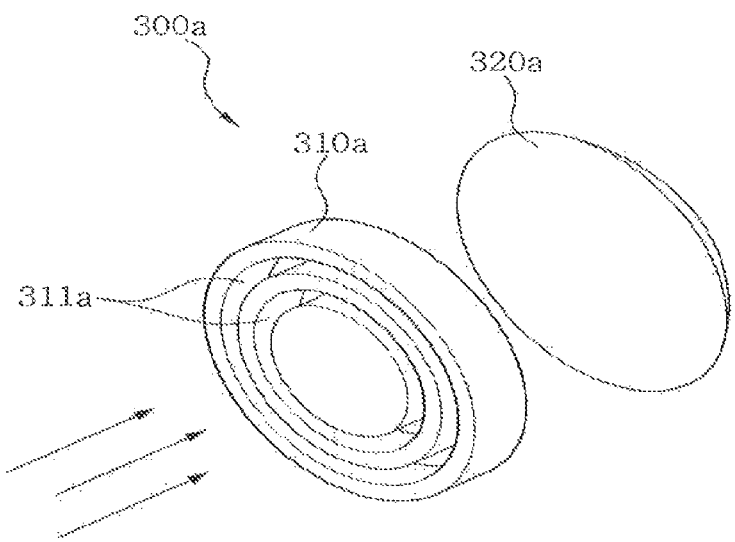
FIGS. 3a and 3b are diagrams illustrating a beam generating unit according to an embodiment of the present invention.
Figure 3B:
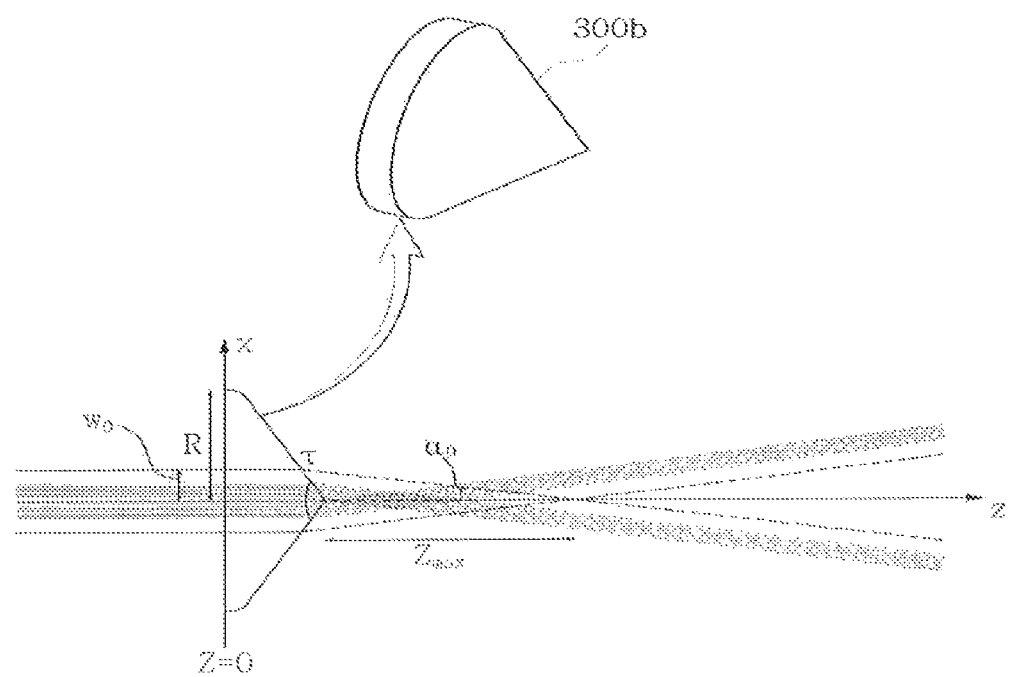

FIGS. 3a and 3b are diagrams illustrating a beam generating unit according to an embodiment of the present invention.

FIG. 3a is a diagram illustrating a Bessel beam generating unit including a diffractive optical element having a plurality of circular grooves or circular holes and a lens having a positive refractive index.

Referring to FIG. 3a, the Bessel beam generating unit 330a may include a diffractive optical element 310a having a plurality of concentric circular grooves or circular holes 311a and a lens 320a having a positive refractive index. In this case, the circular grooves or holes 311a of the diffractive optical element 310a may be formed in a concave plate shape or may be formed through the diffractive optical element 310a. Further, the lens 320a having a positive refractive index is disposed opposite to the side of the diffractive optical element 310a to which parallel light travels.

FIG. 3b is a diagram illustrating a Bessel beaming generating unit that is an axicon lens.

Referring to FIG. 3b, a Bessel beam generating unit may be an axicon lens 300b. In the figure, R is the radius of the axicon lens, $\tau$ is the vertex angle of the axicon lens, $\alpha_0$ is a half the cross angle of beams passing through the axicon lens, and $w_0$ is the radius of parallel light traveling to the axicon lens. Further, the section where a Bessel beam is generated is indicated by 'Zmax' in FIG. 3b, the energy of terahertz waves traveling into the axicon lens is collected to the center along Z-axis due to constructive interference in the section.

In this case, Gaussian beams traveling into the axicon lens and Bessel beams generated by the axicon lens are axially symmetrically distributed, and circular fields are distributed along Z-axis. That is, when seen from the left to the right in FIG. 3b, the Gaussian beams ahead of the axicon lens and the Bessel beams behind the axicon lens are both formed in the shape of a circle. In particular, the Bessel beams generated by the axicon lens spread in a ring shape away from the axicon lens.

On the other hand, in a projection image obtained by moving from points to points such as raster scanning, the most importable factor that determines resolution of the image is the diameter of a beam traveling into an object 1.

In particular, the diameter of a Bessel beam generated by an axicon lens is determined by the wavelength of a terahertz wave and $\alpha_0$, in which $\alpha_0$ can be obtained from the following Equation 1 on the basis of Snell's law.

$$\alpha_0 = \arcsin\left(\frac{n}{n_0}\cos\left(\frac{\tau}{2}\right)\right) + \frac{\tau - \pi}{2} \qquad \text{[Equation 1]}$$

where $n_0$ is the refractive index in air, n is the refractive index of an axicon lens, and τ is the vertex angle of an axicon lens.

On the other hand, Zmax is a DOF, which can be expressed as in the following Equation 2.

$$\text{Zmax} = w_0/\tan\alpha_0 \qquad \text{[Equation 2]}$$

where $w_0$ is, as illustrated in FIG. 3b, the radius of a beam traveling into an axicon lens. It can be found that the DOF also depends on $\alpha_0$ from the Equations.

Accordingly, referring to these facts, the resolution and DOF of an image are usually largely changed by $\alpha_0$.

On the basis of this fact, $\alpha_0$ and the DOF are calculated as follows, assuming that, in the axicon lens illustrated in FIG. 3b, $n_0$ is 1.0, n is 1.54 (High Density Polyethylene), τ is 1500°, and R is 25 mm.

First, $\alpha_0$ can be 8.5° from Equation 1. Further, the DOF (Zmax) can be 40.2 mm from Equation 2.

On the other hand, FDTD (Finite Difference Time Domain) method may be used to more strictly calculate intensity distribution of terahertz waves that are formed when Bessel beams are propagated in a space.

When the Bessel beam generating unit is an axicon lens, the parallel beam traveling into the axicon lens 300b is formed such that its center is aligned with the center of the axicon lens 300b, and if the radius of the parallel beam is $w_0$ and the radius of the axicon lens 300b is R, they may have the following relationship.

$$w_0 \leq (\tfrac{1}{2})R$$

As described above, according to the embodiment in which the magnitude of parallelized electromagnetic waves is a half or less of the diameter of the axicon lens, it is possible to minimize diffractive effect that may be generated at the edge of the axicon lens, so the performance of detecting a projection image can be improved.

Other than this embodiment, the beam generating unit may be implemented in various types such as a hologram structure.

Figure 4A:
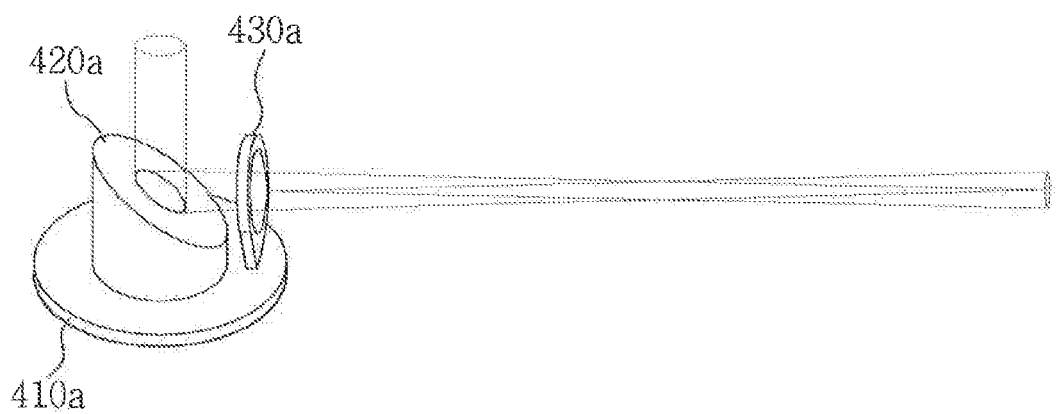
FIGS. 4a and 4b are diagrams illustrating a mechanical combination of a first path shifting unit and a Bessel beam generating unit according to an embodiment of the present invention.
Figure 4B:
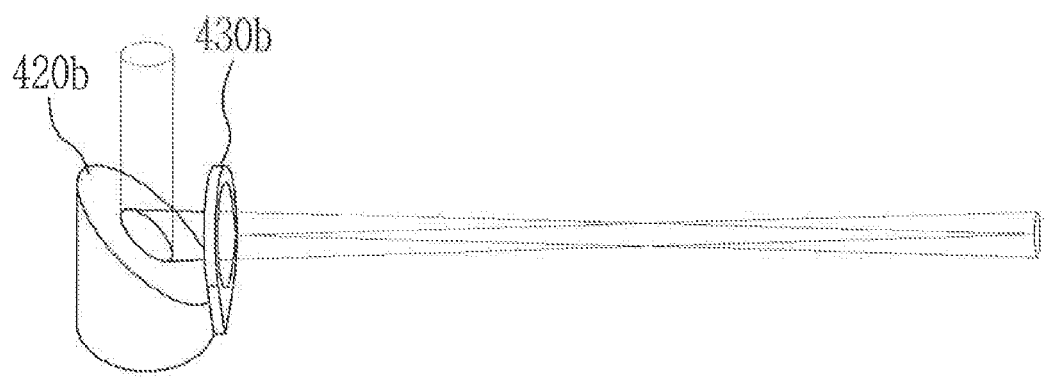

FIGS. 4a and 4b are diagrams illustrating a mechanical combination of a first path shift unit and a Bessel beam generating unit according to an embodiment of the present invention.

FIG. 4a is a diagram illustrating a case when a first path shifting unit and a Bessel beam generating unit are formed on a plate.

Referring to FIG. 4a, a first path shifting unit 420a may be formed on a plate 410a. A Bessel beam generating unit 430a may be formed on the plate 410a, at a predetermined distance from the first path shifting unit 420a. Though not illustrated in the figure, a shaft is formed on a side of the plate 410a, so when a driving unit moves the shaft, the first path shifting unit 420a and the Bessel beam generating unit 430a can be moved together.

Though not described in this embodiment, a link unit such as gears may be disposed between the first path shifting unit 420a and the Bessel beam generating unit 430a so that the first path shifting unit 420a and the Bessel beam generating unit 430a can be operated together.

FIG. 4b is a diagram illustrating a case when a first path shifting unit and a Bessel beam generating unit are directly coupled.

Referring to FIG. 4b, a first path shifting unit 420b and a Bessel beam generating unit 430b may be directly connected. Accordingly, when a driving unit moves the first path shifting unit 420a, the Bessel beam generating unit 430a can be moved with the first path shifting unit 420a.

Figure 5A:
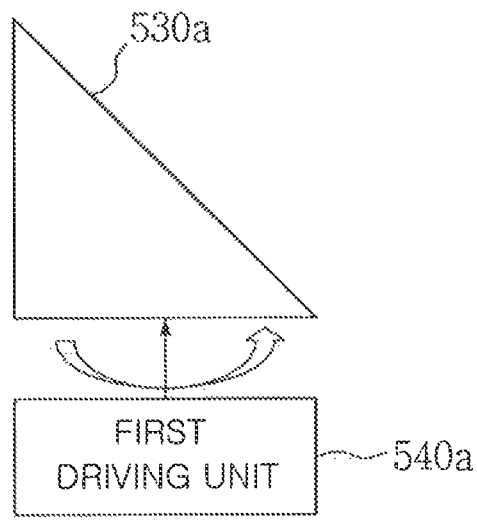
FIGS. 5a, 5b and 5c are diagrams illustrating a driving way of a first driving unit according to an embodiment of the present invention.
Figure 5B:
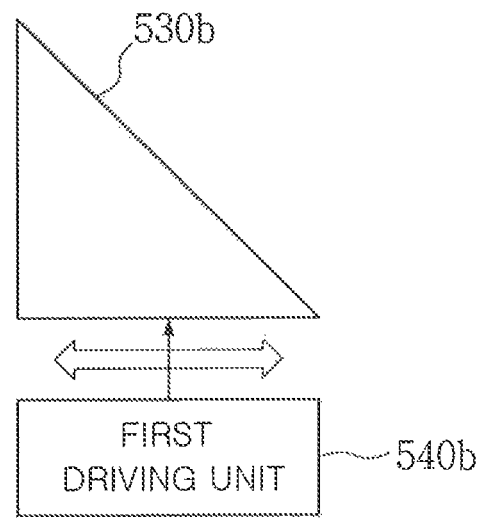

FIGS. 5a and 5b are diagrams illustrating a driving way of a first driving unit according to an embodiment of the present invention.

Referring to FIG. 5a, a first driving unit 540a can rotate about one axis. Accordingly, as the first driving unit 540a rotates, a first path shifting unit 530 rotates. As the first path shifting unit 530a rotates, the position of an object to which a Bessel beam generated by a Bessel beam generating unit is radiated is changed.

Referring to FIG. 5b, a first driving unit 540b can reciprocate straight about one axis. Accordingly, as the first driving unit 540b reciprocates straight, a first path shifting unit 530b reciprocates straight.

Figure 5C:
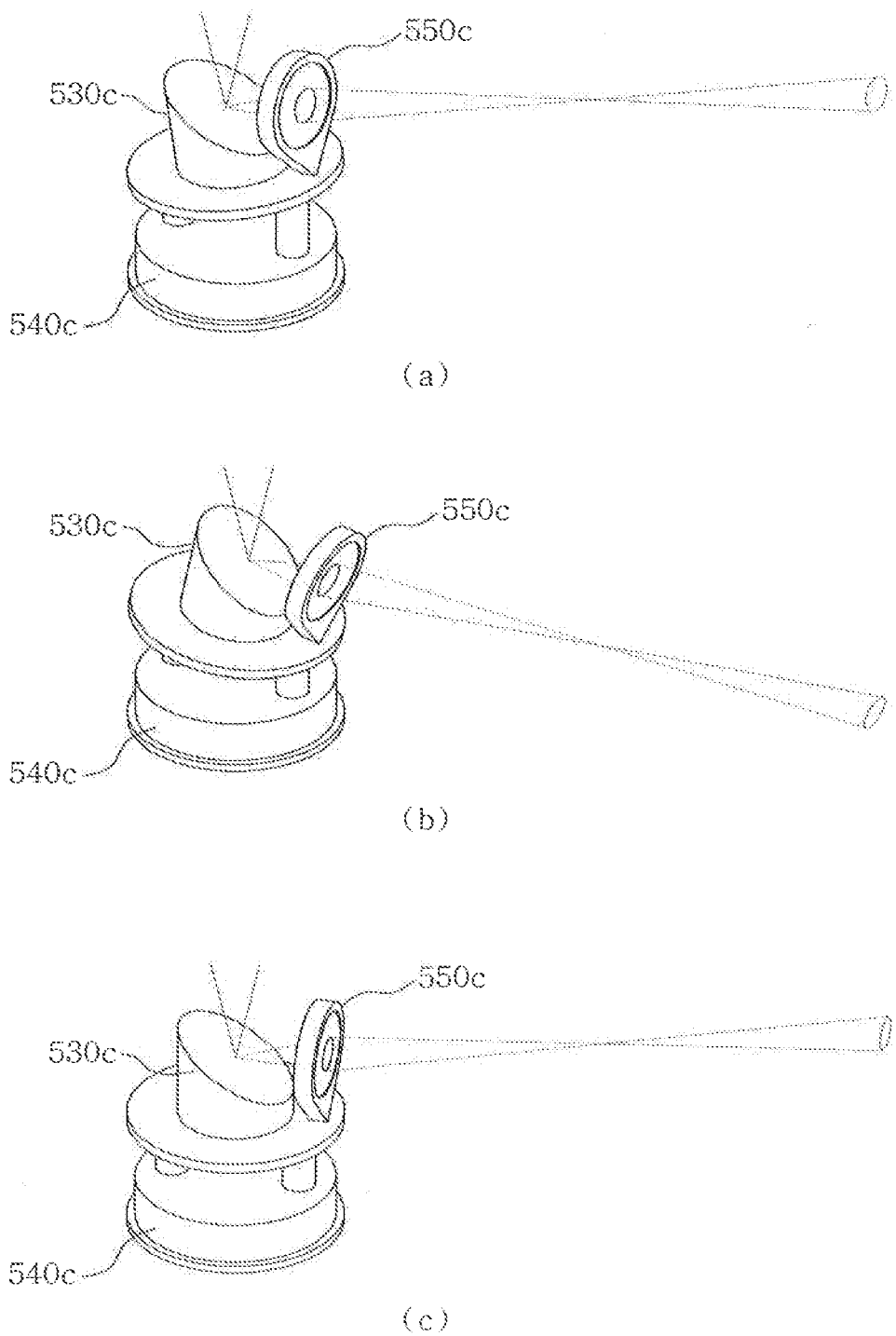

Referring to FIGS. 5a to 5c, a first driving unit 540c may include two actuators. The actuators may be coupled to the lower portion of a first path shifting unit 530c. The inclination of the first path shifting unit 530a is changed by changing the working distance of the two actuators. As the inclination of the first path shifting unit 530c is changed, the inclination of a Bessel beam generated by the Bessel beam generating unit 550c is changed. Accordingly, a detection device can scan an object while changing the position of the Bessel beams radiated to the object. Although two actuators are provided in this embodiment, the number of actuators is not limited and can be changed in various ways.

Though not illustrated in the figures, the first driving unit may be implemented by a two-axial motor. In this case, the first driving unit is operated about two axes, the first path shifting unit is two-dimensionally moved. Accordingly, Bessel beams from the Bessel beam generating unit can be two-dimensionally radiated to an object. Unless the first path shifting unit makes axis-symmetric circular motion, the light source and the electromagnetic wave adjusting unit may also be moved with the first path shifting unit.

Figure 6A:
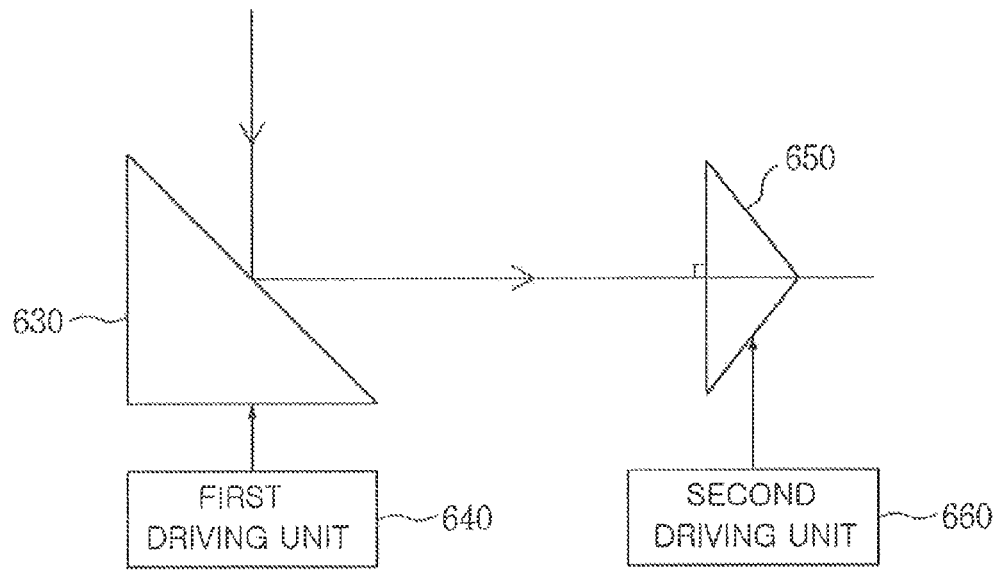
FIGS. 6a and 6b are diagrams illustrating a method of driving the first path shifting unit and the Bessel beam generating unit when the first path shifting unit and the Bessel beam generating unit are spaced from each other.
Figure 6B:
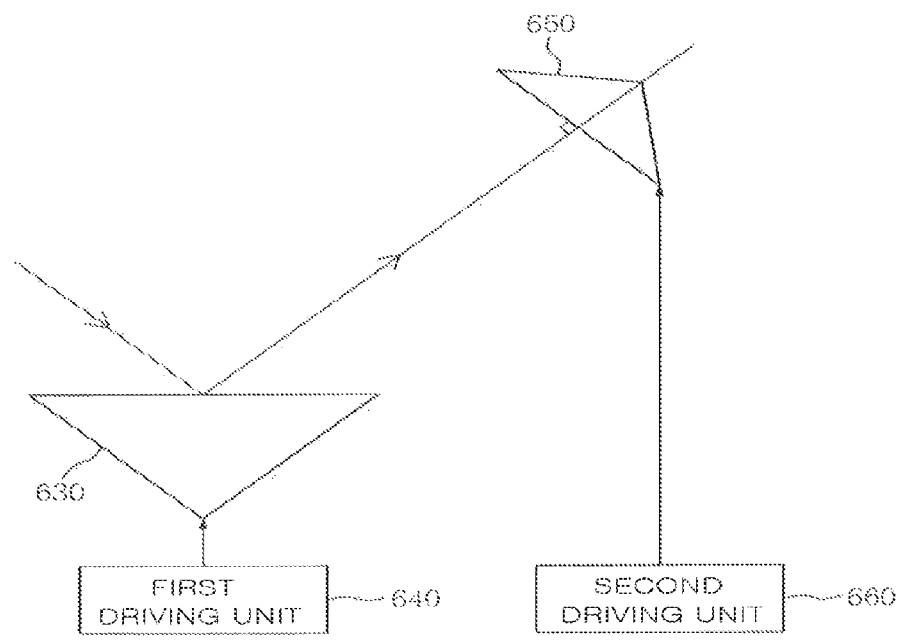

FIGS. 6a and 6b are diagrams illustrating a method of driving the first path shift unit and the Bessel beam generating unit when the first path shift unit and the Bessel beam generating unit are spaced from each other.

Referring to FIG. 6a, a first path shifting unit 630 and a Bessel beam generating unit 650 may be spaced from each other. The Bessel beam generating unit 650 may be disposed such that the electromagnetic wave from the first path shifting unit 630 perpendicularly travels through a light incident surface of the Bessel beam generating unit 650.

The first driving unit 640 can adjust the path of an incident electromagnetic wave by moving the first path shifting unit 630. A second driving unit 660 can move the Bessel beam generating unit 650.

Referring to FIG. 6b, if the first path shifting unit 630 is rotated about 45 degrees by the first driving unit 640, the second driving unit 660 can rotate the Bessel beam generating unit 650 at about 45 degrees. Accordingly, the second driving unit 660 can keep the electromagnetic wave from the first path shifting unit 630 perpendicularly traveling to the light incident surface of the Bessel beam generating unit 650.

Accordingly, even if the first path shifting unit 630 is moved, the electromagnetic waves from the first path shifting unit 630 can keep vertically traveling to the light incident surface of the Bessel beam generating unit 650, so performance can be kept uniform.

Figure 7:
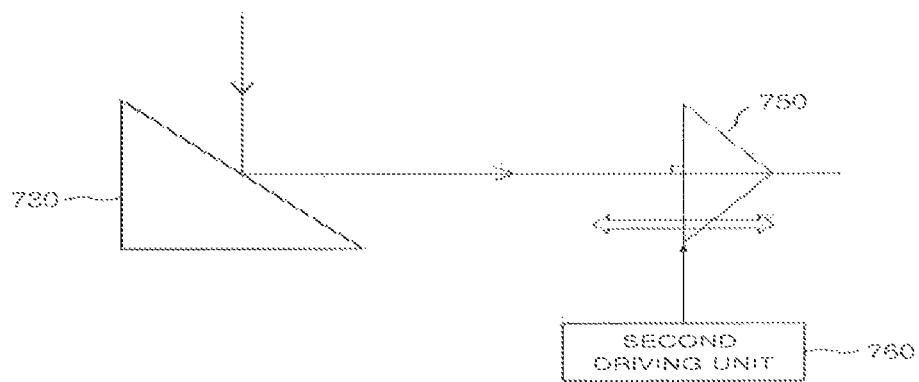
FIG. 7 is a diagram illustrating a method of adjusting the distance between the first path shifting unit and the Bessel beam generating unit according to an embodiment of the present invention.

FIG. 7 is a diagram illustrating a method of adjusting the distance between the first path shift unit and the Bessel beam generating unit according to an embodiment of the present invention.

Referring to FIG. 7, a first path shifting unit 730 and a Bessel beam generating unit 750 may be spaced from each other. It is possible to adjust the distance between the first path shifting unit 730 and the Bessel beam generating unit 750. A second driving unit 760 can adjust the distance between the first path shifting unit 730 and the Bessel beam generating unit 750 by moving the Bessel beam generating unit 750. It is possible to make Bessel beams from the Bessel beam generating unit 750 be formed on an object by changing the position of the Bessel beam generating unit 750 in accordance with the position of the object.

Though not illustrated in the figure, the position of the Bessel beam generating unit 750 can be changed in various ways, for example, a user manually adjusts the position of the Bessel beam generating unit 750 or adjusts the position of the Bessel beam generating unit 750 using a device that can move the Bessel beam generating unit 750 such as a rail.

Figure 8:
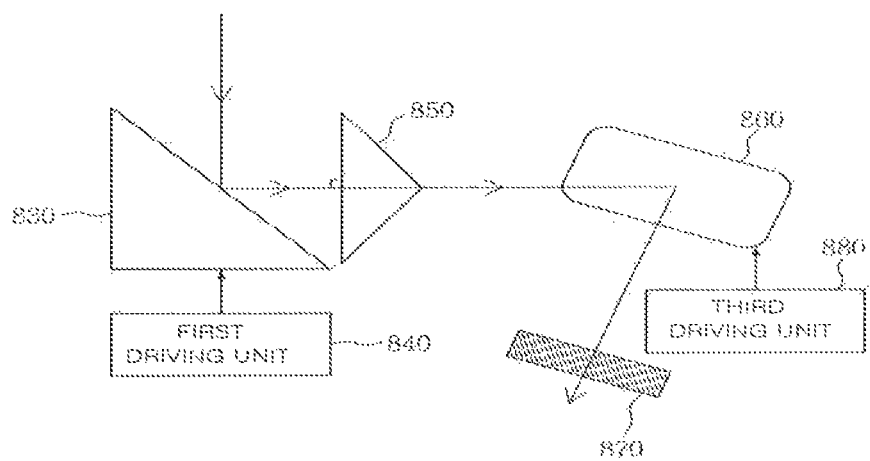
FIG. 8 is a diagram illustrating a scanning module that can perform 2D scanning according to an embodiment of the present invention.

FIG. 8 is a diagram illustrating a scanning module that can perform 2D scanning according to an embodiment of the present invention.

Referring to FIG. 8, a scanning module includes a first path shifting unit 830, a first driving unit 840, a Bessel beam generating unit 850, a second path shifting unit 860, an object 870, and a third driving unit 880.

The first path shifting unit 830 can change the path of an electromagnetic wave from a light source. The electromagnetic wave with the path changed by the first path shifting unit 830 travels into the Bessel generating unit 850.

The first driving unit 840 can adjust the path of an electromagnetic wave by moving the first path shifting unit 830.

The Bessel beam generating unit 850 generates a Bessel beam using the electromagnetic wave with the path changed by the first path shifting unit 830.

The second path shifting unit 860 may be disposed between the Bessel beam generating unit 850 and the object 870. The second path shifting unit 860 can change the path of a Bessel beam such that a Bessel beam is formed on at least a portion of the object 870.

The third driving unit 880 can adjust the path of a Bessel beam by moving the second path shifting unit 860.

As described above, the scanning module can perform 2D scanning on an object, using two path shifting units.

Figure 9:
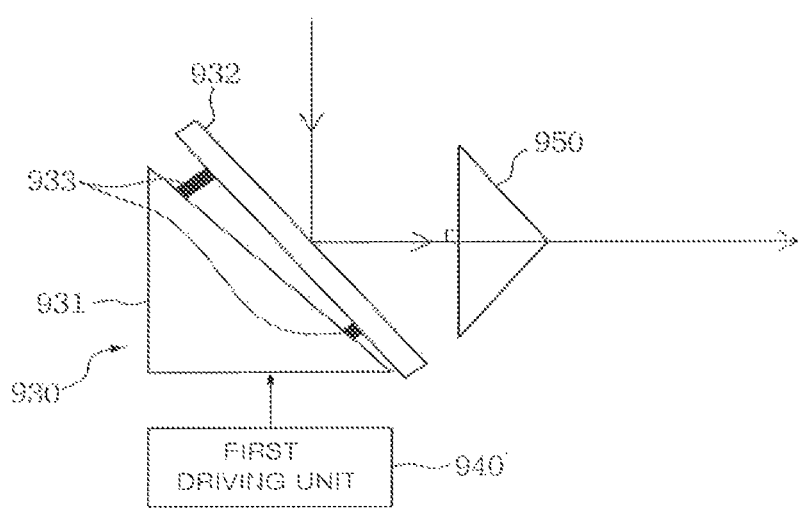
FIG. 9 is a diagram illustrating a scanning module that can perform 2D scanning according to another embodiment of the present invention.

FIG. 9 is a diagram illustrating a scanning module that can perform 2D scanning according to another embodiment of the present invention.

Referring to FIG. 9, a scanning module includes a first path shifting unit 930, a first driving unit 940, and a Bessel beam generating unit 950.

The first path shifting unit 930 may include a body 931, a first reflecting unit 932, and a fourth driving unit 933.

The body 931 can be moved by the first driving unit 940.

The first reflecting unit 932 can change the path of an electromagnetic wave from a light source. The electromagnetic wave with the path changed can travel into the Bessel beam generating unit 950.

The fourth driving unit 933 may be connected to the body 931 at a side and to the first reflecting unit 932 at the other side. The fourth driving unit 933 can adjust the path of an electromagnetic wave by moving the first reflecting unit 932.

One or a plurality of fourth driving units 933 may be provided. The fourth driving unit 933 may be various types of motors such as a voice coil motor.

As described above, the scanning module can perform 2D scanning on an object, using the body moved by the first driving unit and the first reflecting unit moved by the fourth driving unit.

Figure 10A:
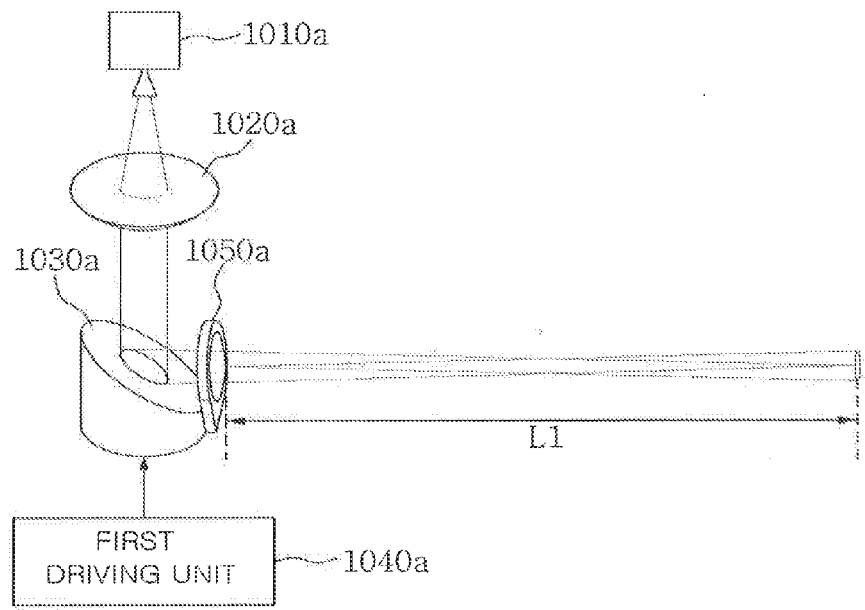
FIGS. 10a and 10b are diagrams illustrating an electromagnetic wave adjusting unit according to an embodiment of the present invention.
Figure 10B:
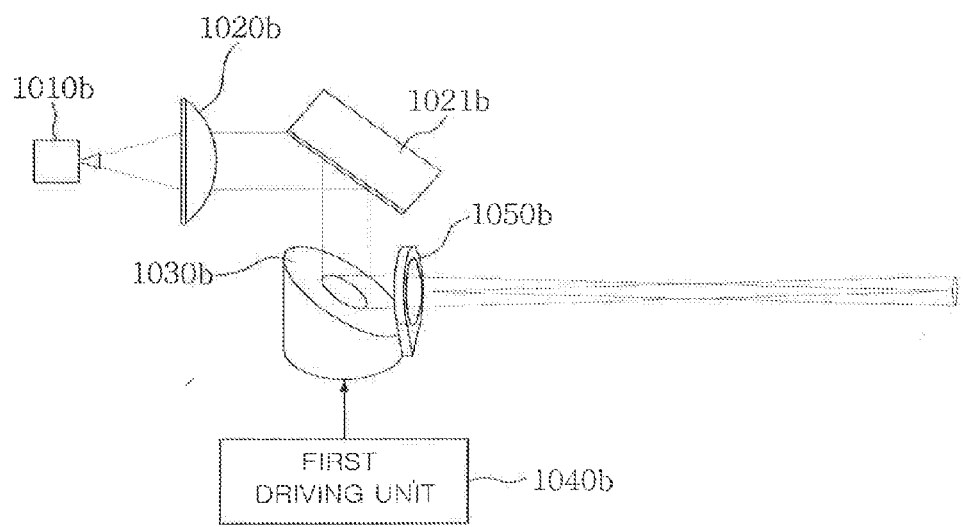

FIGS. 10a and 10b are diagrams illustrating an electromagnetic wave adjusting unit according to an embodiment of the present invention.

Referring to FIG. 10a, an electromagnetic wave adjusting unit may be a collimating unit 1020a that parallelizes and outputs incident electromagnetic waves. For example, the collimating unit 1020a may be a convex lens refracting incident electromagnetic waves in parallel or a parabolic mirror reflecting incident electromagnetic waves in parallel.

The collimating unit 1020a can parallelize electromagnetic waves from a light source 1010a and send the parallelized electromagnetic waves to a first path shifting unit 1030a.

A first driving unit 1040a can adjust the path of an electromagnetic wave by moving the first path shifting unit 1030a.

A Bessel beam generating unit 1050a generates a Bessel beam using the electromagnetic wave with the path changed by the first path shifting unit 1030a. In this case, the length of the Bessel beam is L1.

Referring to FIG. 10b, the electromagnetic wave adjusting unit may include a collimating unit 1020b that parallelizes and outputs incident electromagnetic waves and a second reflecting unit 1021b.

The collimating unit 1020b can parallelize electromagnetic waves from a light source 1010b and send the parallelized electromagnetic waves to the second path shifting unit 1021b.

The second reflecting unit 1021b can reflect the parallelized electromagnetic waves to the first path shifting unit 1030b.

A first driving unit 1040b can adjust the path of an electromagnetic wave by moving the first path shifting unit 1030b.

A Bessel beam generating unit 1050b generates a Bessel beam using the electromagnetic wave with the path changed by the first path shifting unit 1030b.

Though not illustrated in the figure, when using a reflection type, the second reflecting unit 1021b may be a beam splitter. In this case, the beam splitter can send the electromagnetic wave from the collimating unit 1020b to the first path shifting unit 1030b and the electromagnetic wave from the first path shifting unit 1030b to a detecting unit (not illustrated). The detecting unit (not illustrated) may be disposed on the beam splitter 1021b. Further, a focusing unit (not illustrated) that condenses and sends electromagnetic waves from the beam splitter 1021b to the detecting unit may be disposed between the detecting unit and the beam splitter 1021b.

Figure 11A:
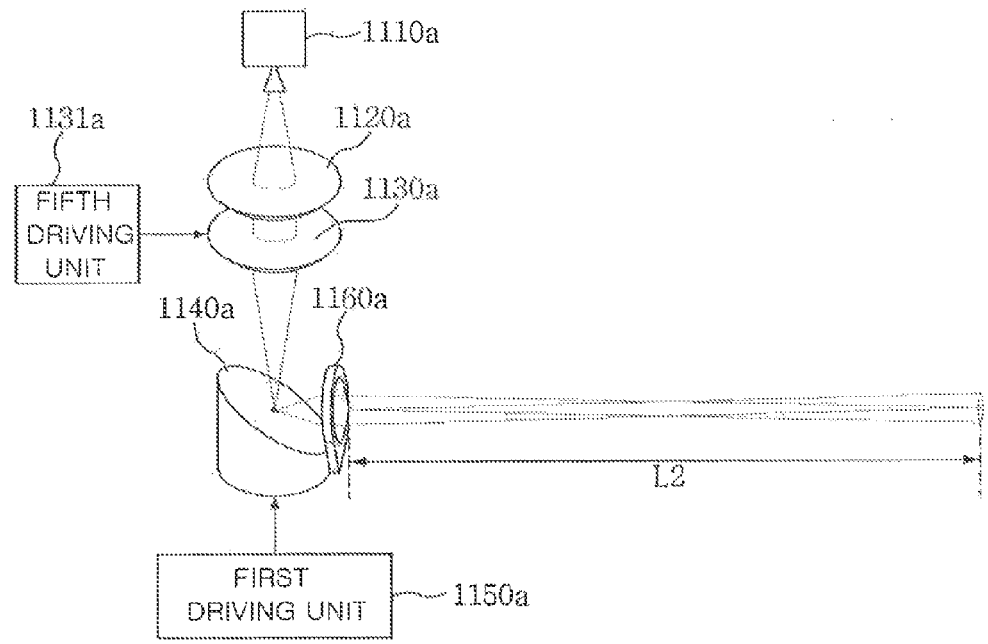
FIGS. 11a and 11b are diagrams illustrating a method of diverging an electromagnetic wave with an electromagnetic wave adjusting unit according to another embodiment of the present invention.
Figure 11B:
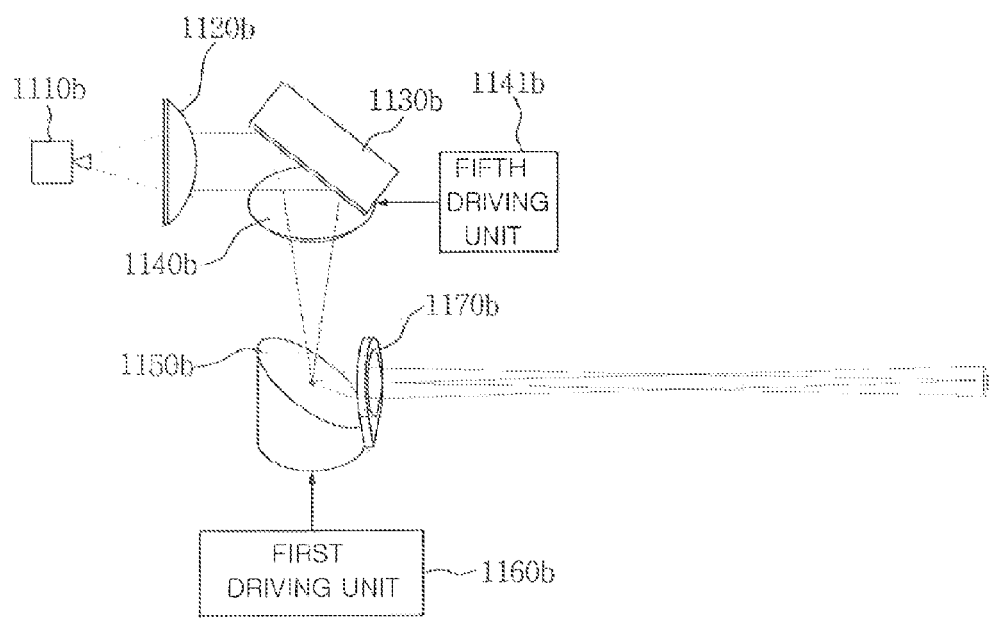

FIGS. 11a and 11b are diagrams illustrating a method of diverging an electromagnetic wave with an electromagnetic wave adjusting unit according to another embodiment of the present invention.

Referring to FIG. 11a, an electromagnetic wave adjusting unit includes a collimating unit 1120a, an optical element 1130a, and a fifth driving unit 1131a.

The collimating unit 1120a can parallelize electromagnetic waves from a light source 1110a and send the parallelized electromagnetic waves to the optical element 1130a.

The optical element 1130*a* can send the parallelized electromagnetic waves to a first path shifting unit 1140*a*.

The fifth driving unit 1131*a* can move the optical element 1130*a* between the collimating unit 1120*a* and the first path shifting unit 1140*a*.

A first driving unit 1150*a* can adjust the path of an electromagnetic wave by moving the first path shifting unit 1140*a*.

A Bessel beam generating unit 1160*a* generates a Bessel beam using the electromagnetic wave with the path changed by the first path shifting unit 1140*a*. In this case, the length of the Bessel beam is L2.

As illustrated in FIG. 11*a*, the fifth driving unit 1131*a* moves the optical element 1130*a* toward the collimating unit 1120*a*. Accordingly, the electromagnetic waves traveling into the first path shifting unit 1140*a* diverge, so the DOF of the Bessel beams generated by the Bessel beam generating unit 1160*a* increases.

Referring to FIG. 11*b*, an electromagnetic wave adjusting unit includes a collimating unit 1120*b*, a second reflecting unit 1130*b*, an optical element 1140*b*, and a fifth driving unit 1141*b*.

The collimating unit 1120*b* can parallelize electromagnetic waves from a light source 1110*b* and send the parallelized electromagnetic waves to the second reflecting unit 1130*b*.

The second reflecting unit 1130*b* reflects the parallelized electromagnetic waves to the optical element 1140*b*.

The optical element 1140*b* can send the parallelized electromagnetic waves to a first path shifting unit 1150*b*.

The fifth driving unit 1141*a* can move the optical element 1140*a* between the second reflecting unit 1130*b* and the first path shifting unit 1150*b*.

The first driving unit 1160*b* can adjust the path of an electromagnetic wave by moving the first path shifting unit 1150*b*.

A Bessel beam generating unit 1170*b* generates a Bessel beam using the electromagnetic wave with the path changed by the first path shifting unit 1150*b*.

As illustrated in FIG. 11*b*, the fifth driving unit 1141*b* moves the optical element 1140*b* toward the second reflecting unit 1130*b*. Accordingly, the electromagnetic waves traveling into the first path shifting unit 1150*b* diverge, so the DOF of the Bessel beams generated by the Bessel beam generating unit 1170*b* increases.

Figure 12A:
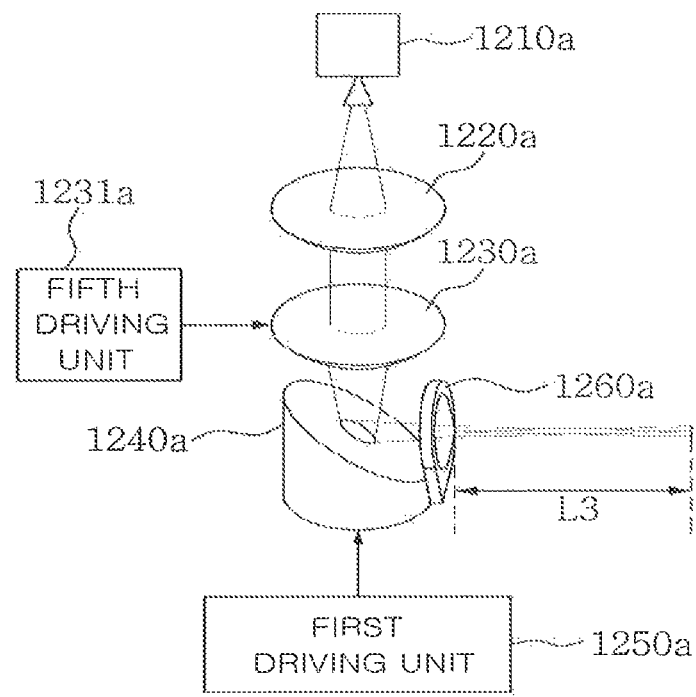
FIGS. 12a and 12b are diagrams illustrating a method of converging an electromagnetic wave with an electromagnetic wave adjusting unit according to another embodiment of the present invention.
Figure 12B:
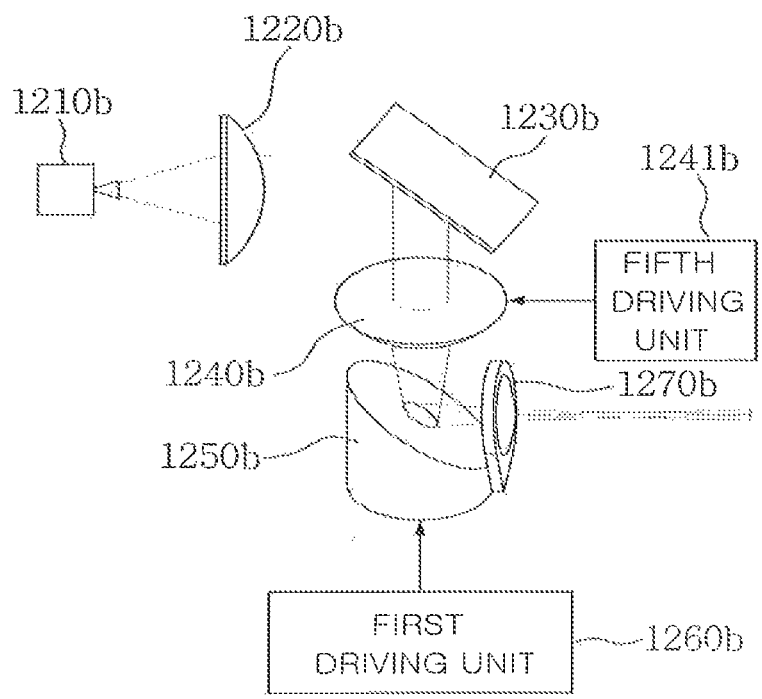

FIGS. 12*a* and 12*b* are diagrams illustrating a method of converging an electromagnetic wave with an electromagnetic wave adjusting unit according to another embodiment of the present invention.

Referring to FIG. 12*a*, an electromagnetic wave adjusting unit includes a collimating unit 1220*a*, an optical element 1230*a*, and a fifth driving unit 1231*a*.

The collimating unit 1220*a* can parallelize electromagnetic waves from a light source 1210*a* and send the parallelized electromagnetic waves to the optical element 1230*a*.

The optical element 1230*a* can send the parallelized electromagnetic waves to a first path shifting unit 1240*a*.

The fifth driving unit 1231*a* can move the optical element 1230*a* between the collimating unit 1220*a* and the first path shifting unit 1240*a*.

A first driving unit 1250*a* can adjust the path of an electromagnetic wave by moving the first path shifting unit 1240*a*.

A Bessel beam generating unit 1260*a* generates a Bessel beam using the electromagnetic wave with the path changed by the first path shifting unit 1240*a*. In this case, the length of the Bessel beam is L3.

Comparing the length L1 of the Bessel beam in FIG. 10*a*, the length L2 of the Bessel beam in FIG. 11*a*, and the length L3 of the Bessel beam in FIG. 12*a*, the relationship is L2>L1>L3. In other words, the length L2 when electromagnetic waves diverge is the largest and the length L3 when electromagnetic waves converge is the smallest. The length L1 when electromagnetic waves are collimated is between the length L2 and the length L3.

As illustrated in FIG. 12*a*, the fifth driving unit 1231*a* moves the optical element 1230*a* toward the first path shifting unit 1240*a*. Accordingly, the electromagnetic waves traveling into the first path shifting unit 1240*a* converge, so the DOF of the Bessel beams generated by the Bessel beam generating unit 1160*a* decreases.

Referring to FIG. 12*b*, an electromagnetic wave adjusting unit includes a collimating unit 1220*b*, a second reflecting unit 1230*b*, an optical element 1240*b*, and a fifth driving unit 1241*b*.

The collimating unit 1220*b* can parallelize electromagnetic waves from a light source 1210*b* and send the parallelized electromagnetic waves to the second reflecting unit 1230*b*.

The second reflecting unit 1230*b* reflects the parallelized electromagnetic waves to the optical element 1240*b*.

The optical element 1240*b* can send the parallelized electromagnetic waves to a first path shifting unit 1250*b*.

The fifth driving unit 1241*b* can move the optical element 1240*a* between the second reflecting unit 1230*b* and the first path shifting unit 1250*b*.

The first driving unit 1260*b* can adjust the path of an electromagnetic wave by moving the first path shifting unit 1250*b*.

A Bessel beam generating unit 1270*b* generates a Bessel beam using the electromagnetic wave with the path changed by the first path shifting unit 1250*b*.

As illustrated in FIG. 12*b*, the fifth driving unit 1241*b* moves the optical element 1240*b* toward the first path shifting unit 1250*b*. Accordingly, the electromagnetic waves traveling into the first path shifting unit 1250*b* converge, so the DOF of the Bessel beams generated by the Bessel beam generating unit 1270*b* decreases.

As described with reference to FIGS. 11*a* to 12*b*, the fifth driving unit can converge or diverge electromagnetic waves from the first path shifting unit by moving the optical element. Accordingly, it is possible to increase or decrease the DOF of the Bessel beams generated by the Bessel beam generating unit. Accordingly, a user can control the fifth driving unit to obtain a desired DOF.

Figure 13:
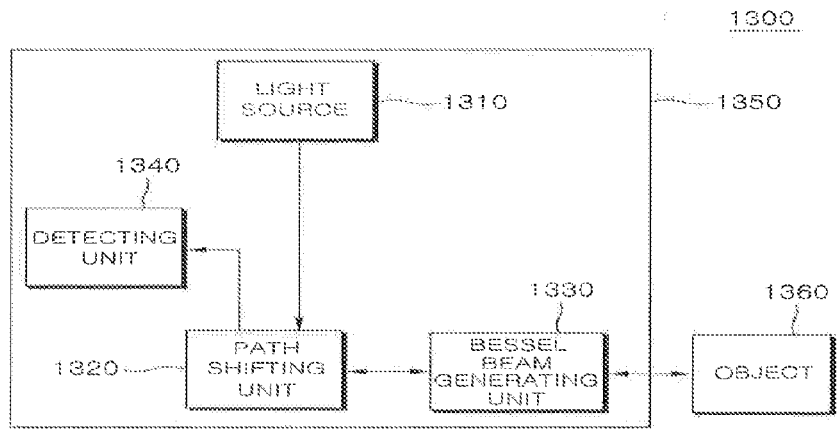
FIG. 13 is a block diagram illustrating a detection probe relating to an embodiment of the present invention.

FIG. 13 is a block diagram illustrating a detection probe relating to an embodiment of the present invention.

Referring to FIG. 13, a detection probe 1300 includes a light source 1310, a path shifting unit 1320, a Bessel beam generating unit 1330, a detecting unit 1340, and a housing 1350.

The light source 1310 may be various devices that can generate an electromagnetic wave. For example, the light source 1310 can generate a millimeter wave or terahertz wave. The millimeter wave is an electromagnetic wave at an extremely high frequency and may have a frequency from 30 GHz to 300 GHz. The terahertz wave means an electromagnetic wave in a terahertz range and may have a frequency of 0.1 THz to 10 THz, preferably. However, even if the terahertz wave comes out of the range, it can be considered as a terahertz wave, of course, used in the present invention when its range can be easily inferred by those skilled in the art.

The path shifting unit 1320 can change the path of an electromagnetic wave from the light source 1310. The electromagnetic wave with the path changed by the path shifting unit 1320 travels into the Bessel generating unit 1330.

For example, the path shifting unit 1320 may include a reflective surface for changing the path of an incident electromagnetic wave. The reflective surface can reflect an incident electromagnetic wave to the Bessel beam generating unit 1330.

The Bessel beam generating unit 1330 can make a Bessel beam on at least a portion of an object 1360, using the electromagnetic wave with the path changed by the path shifting unit 1320. However, it is practically difficult to generate an ideal beam, so the Bessel beams generated by the Bessel beam generating unit 1330 can be considered as a quasi-Bessel beam (QBB).

A Bessel beam is an electromagnetic wave given as a zeroth-order Bessel function of the first kind in a solution set of Maxwell equation about a free space and has been known as a non-diffracting beam. The Bessel beam was first introduced by Durnin in 1987 and has axial asymmetry, in which energy is concentrated as much as a predetermined length about an axis in the shape of a needle. Since it is implemented by an optical system having not an infinite aperture, but a limited aperture, there is no Bessel beam that infinitely travels, so it is also usually called QBB (Quasi-Bessel-Beam). The QBB is made by a hologram, a combination of a lens and a circular mask composed of a plurality of ring or limited aperture, or by a conical lens known as an axicon.

The Bessel beam generating unit 1330 may be disposed such that the electromagnetic wave with the path changed by the path shifting unit 1320 perpendicularly travels through the light incident surface of the Bessel beam generating unit 1330.

The Bessel beam generating unit 1330 may be achieved in various types, for example, being composed of a diffractive optical element having a plurality of circular grooves or circular holes and a lens having a positive refractive index, being an axicon lens, a hologram optical element, or the like.

As an example of combination and a way of driving the path shifting unit 1320 and the Bessel beam generating unit 1330, the path shifting unit 1320 and the Bessel beam generating unit 1330 may be mechanically combined. In this case, the path shifting unit 1320 and the Bessel beam generating unit 1330 are moved together.

The detecting unit 1340 can detect intensity of an electromagnetic wave from the object 1360. For example, the detecting unit 1340 can detect the intensity of electromagnetic waves reflecting from, passing through, diffracting from, or dispersed from the object 1360. Although the detecting unit 1340 detects the intensity of electromagnetic waves reflecting form the object 1360 through the path shifting unit 1320 and the Bessel beam generating unit 1330 in this embodiment, the detecting unit 1340 may detect the intensity of transmitting electromagnetic waves formed opposite to the Bessel beam generating unit 1330 from the object 1360 or the intensity of diffused electromagnetic waves around the object 1360.

The housing 1350 may accommodate the light source 1310, the path shifting unit 1320, the Bessel beam generating unit 1330, and the detecting unit 1340. For example, all or some of the light source 1310, the path shifting unit 1320, the Bessel beam generating unit 1330, and the detecting unit 1340 may be mechanically combined with the housing 1350.

The object 1360 means an object to be examined.

Since the detection probe uses Bessel beams, resolution is improved and a long DOF is ensured, so the working distance can be increased and the detection performance can be improved.

Further, the detection probe can perform scanning while rotating, so it can be more useful for cylindrical objects.

Figure 14A:
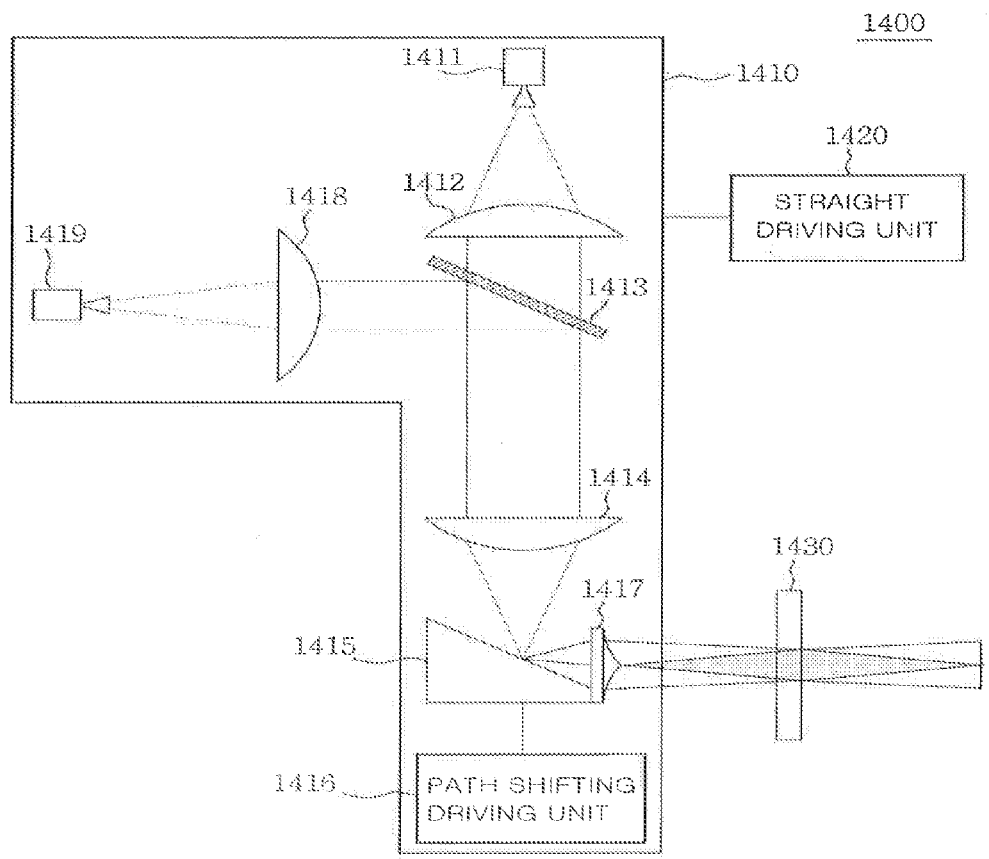
FIGS. 14a and 14b are diagram illustrating a probe type detection device relating to an embodiment of the present invention.
Figure 14B:
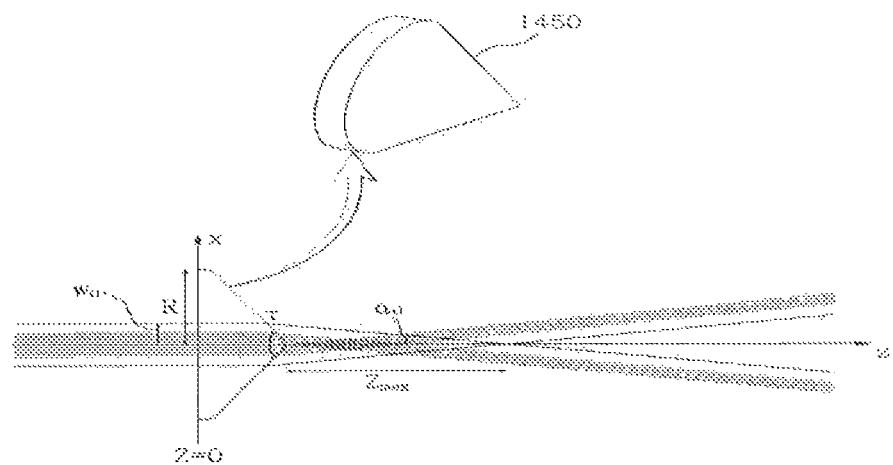

FIGS. 14a and 14b are diagram illustrating a probe type detection device relating to an embodiment of the present invention.

Referring to FIG. 14a, a probe type detection device 1400 may include a detection probe and a straight driving unit 220.

The detection probe includes a housing 1410, a light source 1411, a collimating unit 1412, a beam splitter 1413, a focusing lens 1414, a path shifting unit 1415, a path shifting driving unit 1416, a Bessel beam generating unit 1417, a focusing unit 1418, and a detecting unit 1419.

The housing 1410 can accommodate the light source 1411, the collimating unit 1412, the beam splitter 1413, the focusing lens 1414, the path shifting unit 1415, the path shifting driving unit 1416, the Bessel beam generating unit 1417, the focusing unit 1418, and the detecting unit 1419.

The light source 1411 may be various devices that can generate an electromagnetic wave.

The collimating unit 1412 can parallelize electromagnetic waves from the light source 1411.

The beam splitter 1413 can sends electromagnetic waves from the collimating unit 1412 to the focusing lens 1414.

The beam splitter 1413 can reflect electromagnetic waves, which reflects from the object 1430 and travels through the Bessel beam generating unit 1417 and the path shifting unit 1415, to the focusing unit 1418.

The focusing lens 1414 can condense the electromagnetic waves from the beam splitter 1413 to the path shifting unit 1415.

The path shifting unit 1415 can change the path of electromagnetic waves from the focusing lens 1414. The electromagnetic waves with the path changed by the path shifting unit 1415 travel into the Bessel generating unit 1417. The path shifting unit 1415 and the Bessel beam generating unit 1417 can be mechanically combined.

The path shifting driving unit 1416 can adjust the path of an electromagnetic wave by moving the path shifting unit 1415. For example, when the path shifting driving unit 1416 rotates, the path shifting unit 1415 and the Bessel beam generating unit 1417 can rotate. Accordingly, it is possible to effectively scan the circular object 1430 around the probe type detection device 1400.

The Bessel beam generating unit 1417 can make a Bessel beam on at least a portion of an object 1430, using the electromagnetic wave with the path changed by the path shifting unit 1415. However, it is practically difficult to generate an ideal beam, so the Bessel beams generated by the Bessel beam generating unit 1417 can be considered as a quasi-Bessel beam (QBB).

The focusing unit 1418 is disposed between the beam splitter 1413 and the detecting unit 1419 and can send electromagnetic waves coming out from the beam splitter 1413 and reflecting from the object 1430 through the path shifting unit 1415 and the Bessel beam generating unit 1417 to the detecting unit 1419.

The detecting unit 1419 can detect intensity of an electromagnetic wave from the focusing unit 1418.

The straight driving unit 1420 can move straight the housing 1410. As the path shifting driving unit 1416 rotates and the straight driving unit 1420 moves straight, the probe type detection device 1400 can perform scanning not only in the rotational direction, but the vertical direction.

Referring to FIG. 14*b*, a Bessel beam generating unit may be an axicon lens 1450. Although an axicon lens is exemplified for the Bessel beam generating unit in this embodiment, the Bessel beam generating unit may be implemented in various types. In the figure, R is the radius of the axicon lens, τ is the vertex angle of the axicon lens, $\alpha_0$ is a half the cross angle of beams passing through the axicon lens, and $w_0$ is the radius of parallel light traveling to the axicon lens. Further, the section where a Bessel beam is generated is indicated by 'Zmax' in FIG. 14*b*, the energy of terahertz waves traveling into the axicon lens is collected to the center along Z-axis due to constructive interference in the section.

In this case, Gaussian beams traveling into the axicon lens and Bessel beams generated by the axicon lens are axially symmetrically distributed, and circular fields are distributed along Z-axis. That is, when seen from the left to the right in FIG. 14*b*, the Gaussian beams ahead of the axicon lens and the Bessel beams behind the axicon lens are both formed in the shape of a circle. In particular, the Bessel beams generated by the axicon lens spread in a ring shape away from the axicon lens.

On the other hand, in a projection or reflection image obtained by moving from points to points such as raster scanning, the most importable factor that determines resolution of the image is the diameter of a beam traveling into an object.

In particular, the diameter of a Bessel beam generated by an axicon lens is determined by the wavelength of a terahertz wave and $\alpha_0$, on the basis of Snell's law in which $\alpha_0$ can be obtained from the following Equation 3.

$$\alpha_0 = \arcsin\left(\frac{n}{n_0}\cos\left(\frac{\tau}{2}\right)\right) + \frac{\tau - \pi}{2} \quad \text{[Equation 3]}$$

where $n_0$ is the refractive index in air, n is the refractive index of an axicon lens, and τ is the vertex angle of an axicon lens.

On the other hand, Zmax is a DOF, which can be expressed as in the following Equation 4.

$$Zmax = w_0/\tan\alpha_0 \quad \text{[Equation 4]}$$

where $w_0$ is, as illustrated in FIG. 14*b*, the radius of a beam traveling into an axicon lens. It can be found that the DOF also depends on $\alpha_0$ from the Equations.

Accordingly, referring to these facts, the resolution and DOE of an image are usually largely changed by $\alpha_0$.

On the basis of this fact, $\alpha_0$ and the DOF are calculated as follows, assuming that, in the axicon lens illustrated in FIG. 14*b*, $n_0$ is 1.0, n is 1.54 (High Density Polyethylene), τ is 150°, and R is 25 mm.

First, $\alpha_0$ can be 8.5° from Equation 3. Further, the DOF (Zmax) can be 40.2 mm from Equation 4.

FDTD (Finite Difference Time Domain) method may be used to more strictly calculate intensity distribution of terahertz waves that are formed when Bessel beams are propagated in a space.

When the Bessel beam generating unit is an axicon lens, the parallel beam traveling into the axicon lens 1450 is formed such that its center is aligned with the center of the axicon lens 1450, and if the radius of the parallel beam is $w_0$ and the radius of the axicon lens 1450 is R, they may have the following relationship.

$$w_0 \leq (1/2)R$$

As described above, according to the embodiment in which the magnitude of parallelized electromagnetic waves is a half or less of the diameter of the axicon lens, it is possible to minimize diffractive effect that may be generated at the edge of the axicon lens, and so the performance of detecting a projection or reflection image can be improved.

Figure 15:
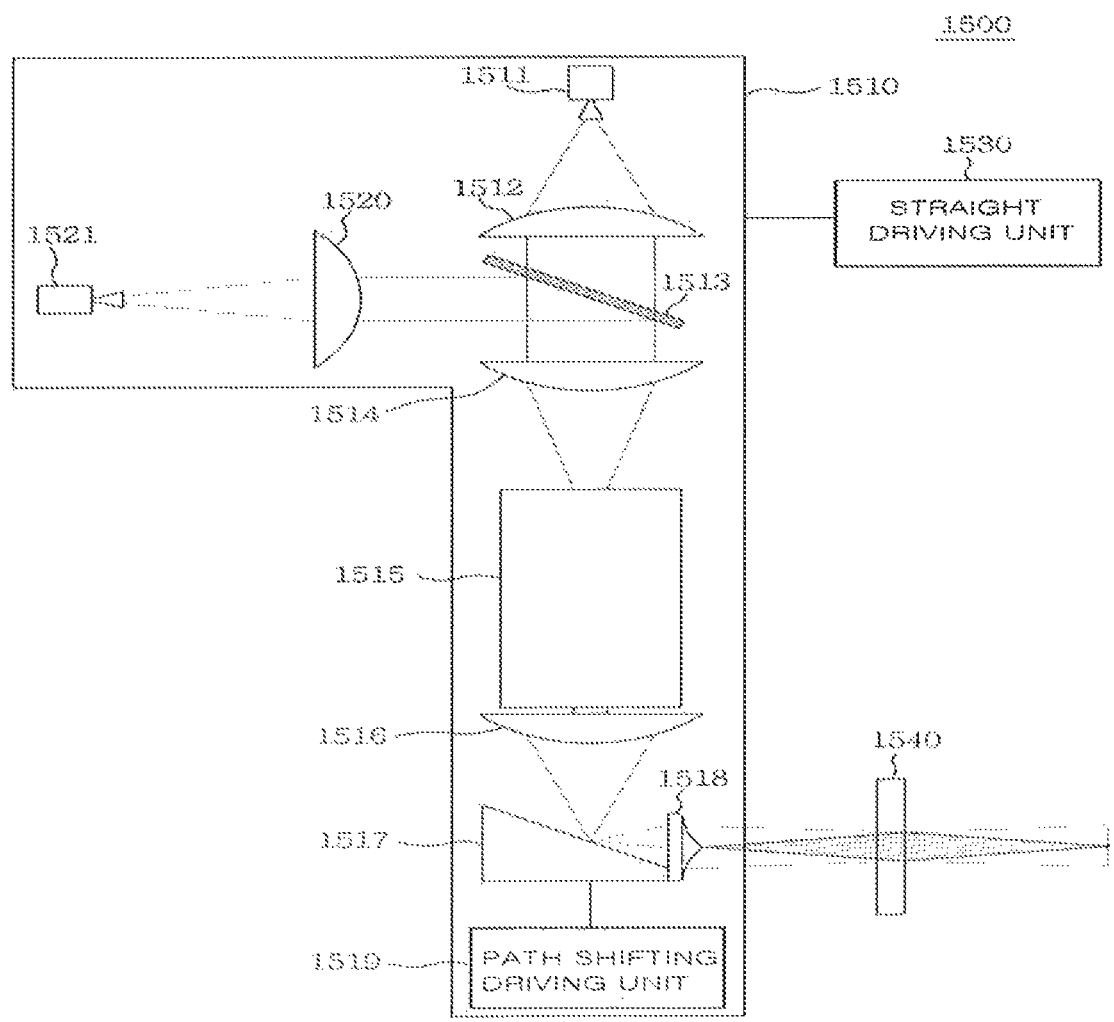
FIG. 15 is a diagram illustrating a probe type detection device relating to another embodiment of the present invention.

FIG. 15 is a diagram illustrating a probe type detection device relating to another embodiment of the present invention.

Referring to FIG. 15*a*, a probe type detection device 1500 may include a detection probe and a straight driving unit 1530.

The detection probe includes a housing 1510, a light source 1511, a collimating unit 1512, a beam splitter 1513, a coupling lens 1514, a waveguide 1515, a focusing lens 1516, a path shifting unit 1517, a Bessel beam generating unit 1518, a path shifting driving unit 1519, a focusing unit 1520, and a detecting unit 1521.

The housing 1510 can accommodate the light source 1511, the collimating unit 1512, the beam splitter 1513, the coupling lens 1514, the waveguide 1515, the focusing lens 1516, the path shifting unit 1517, the Bessel beam generating unit 1518, the path shifting driving unit 1519, the focusing unit 1520, and the detecting unit 1521.

The light source 1511 may be various devices that can generate an electromagnetic wave.

The collimating unit 1512 can parallelize electromagnetic waves from the light source 1511.

The beam splitter 1513 can sends electromagnetic waves from the collimating unit 1512 to the coupling lens 1514.

The beam splitter 1513 can reflect electromagnetic waves, which is reflected from the object 1540 and travels through the coupling lens 1514, the waveguide 1515, the focusing lens 1516, the path shifting unit 1517, and the Bessel beam generating unit 1514, to the focusing unit 1520.

The coupling lens 1514 can send electromagnetic waves from the beam splitter 1513 into the waveguide 1515.

The waveguide 1515 may be disposed between the coupling lens 1514 and the focusing lens 1516.

The focusing lens 1516 can condense the electromagnetic waves discharged from the waveguide 1515 to the path shifting unit 1517.

The path shifting unit 1517 can change the path of electromagnetic waves from the focusing lens 1516. The electromagnetic waves with the path changed by the path shifting unit 1517 travel into the Bessel generating unit 1518. The path shifting unit 1517 and the Bessel beam generating unit 1518 can be mechanically combined.

The Bessel beam generating unit 1518 can make a Bessel beam on at least a portion of an object 1540, using the electromagnetic wave with the path changed by the path shifting unit 1517. However, it is practically difficult to generate an ideal beam, so the Bessel beams generated by the Bessel beam generating unit 1518 can be considered as a quasi-Bessel beam (QBB).

The path shifting driving unit 1519 can adjust the path of an electromagnetic wave by moving the path shifting unit 1517. For example, when the path shifting driving unit 1519 rotates, the path shifting unit 1517 and the Bessel beam generating unit 1518 can rotate. Accordingly, it is possible to effectively scan the circular object 1540 around the probe type detection device 1500.

The focusing unit 1520 is disposed between the beam splitter 1513 and the detecting unit 1521 and can condense electromagnetic waves reflecting from the beam splitter 1513 and send them to the detecting unit 1521.

The detecting unit 1521 can detect intensity of an electromagnetic wave from the focusing unit 1520.

The straight driving unit 1530 can move straight the housing 1510. As the path shifting driving unit 1519 rotates and the straight driving unit 1530 moves straight, the probe type detection device 1500 can perform scanning not only in the rotational direction, but the vertical direction.

Further, since the probe type detection device uses a waveguide, it is possible to prevent deterioration of performance even if the length of the detection probe increases.

Figure 16:
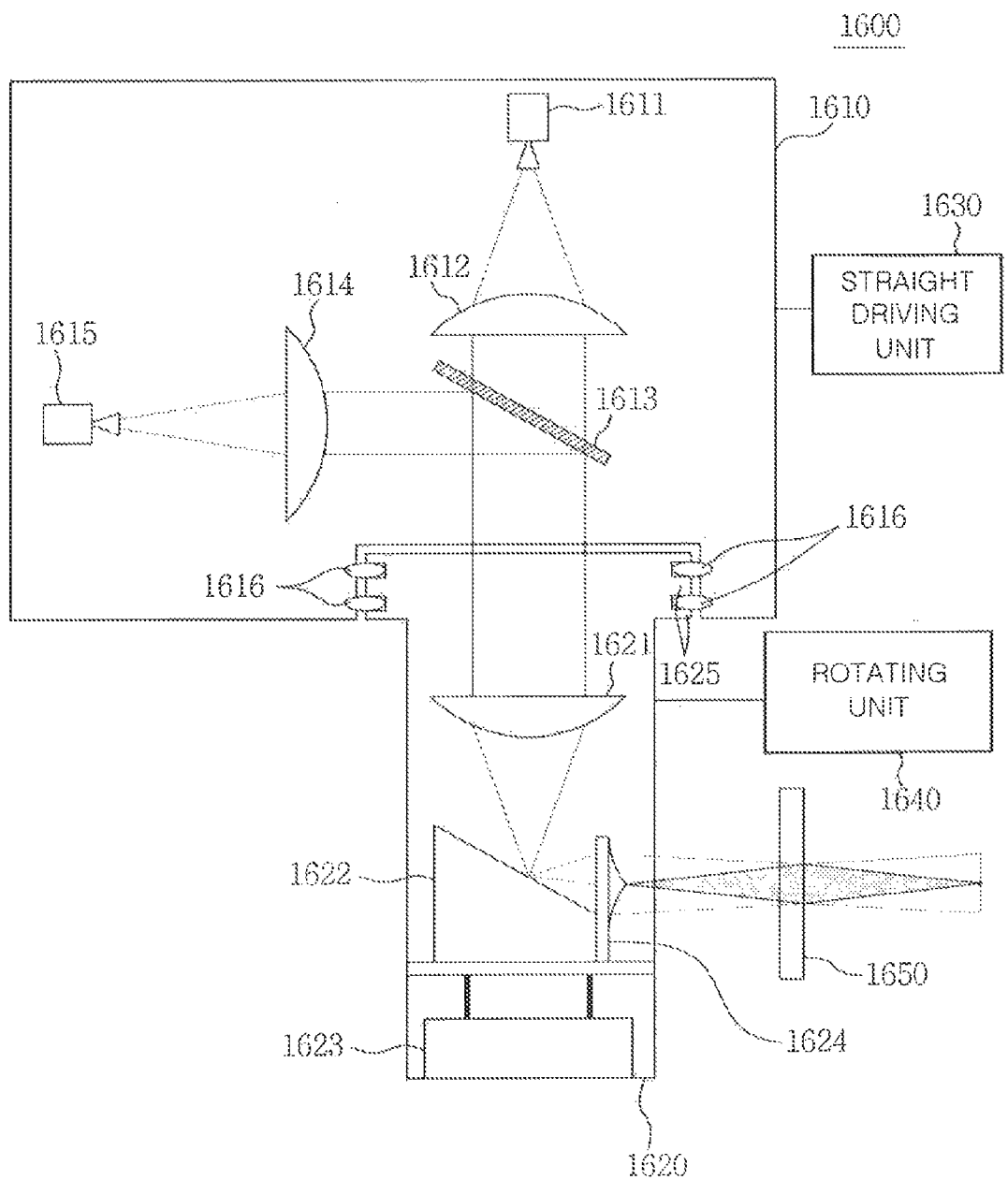
FIG. 16 is a diagram illustrating a probe type detection device relating to another embodiment of the present invention.

FIG. 16 is a diagram illustrating a probe type detection device relating to another embodiment of the present invention.

Referring to FIG. 16a, a probe type detection device 1600 may include a detection probe, a straight driving unit 1630, and rotating unit 1640.

The detection probe includes a first housing 1610, a light source 1611, a collimating unit 1612, a beam splitter 1613, a focusing unit 1614, a detecting unit 1615, a rotary member 1616, a second housing 1620, a focusing lens 1621, a path shifting unit 1622, a path shifting driving unit 1623, and a Bessel beam generating unit 1624.

The first housing 1610 can accommodate the light source 1611, the collimating unit 1612, the beam splitter 1613, the focusing unit 1614, the detecting unit 1615, and the rotary member 1616.

The first housing 1610 has a groove that can receive the second housing 1620 and includes rotary members 1610, which allow the second housing 1620 can be rotated in the groove, at both sides of the groove.

The light source 1611 may be various devices that can generate an electromagnetic wave.

The collimating unit 1612 can parallelize electromagnetic waves from the light source 1611.

The beam splitter 1613 can sends electromagnetic waves from the collimating unit 1612 to the focusing lens 1621.

The beam splitter 1613 can reflect electromagnetic waves, which are reflected from the object 1650 and travels through the focusing lens 1621, the path shifting unit 1622, and the Bessel beam generating unit 1621, to the focusing unit 1614.

The focusing unit 1614 is disposed between the beam splitter 1613 and the detecting unit 1615 and can send electromagnetic waves coming out from the beam splitter 1613 and reflecting from the object 1650 through the focusing lens 1621, the path shifting unit 1622, and the Bessel beam generating unit 1624 to the detecting unit 1615.

The detecting unit 1615 can detect intensity of an electromagnetic wave from the focusing unit 1614.

The second housing 1620 can accommodate the focusing lens 1621, the path shifting unit 1622, the path shifting driving unit 1623, and the Bessel beam generating unit 1624.

The second housing 1620 may include coupling portions 1625 coupled to the rotary members 1616. Accordingly, even if the second housing 1620 is rotated by the rotating unit 1640, the second housing 1620 cannot be separated from the first housing 1610.

The focusing lens 1621 can condense the electromagnetic waves from the beam splitter 1613 to the path shifting unit 1622.

The path shifting unit 1622 can change the path of electromagnetic waves from the focusing lens 1621. The electromagnetic waves with the path changed by the path shifting unit 1622 travel into the Bessel generating unit 1624. The path shifting unit 1622 and the Bessel beam generating unit 1624 can be mechanically combined.

The path shifting driving unit 1623 may include at least two or more actuators. The actuators may be coupled to the lower portion of the path shifting unit 1622. It is possible to changing the inclination of the path shifting unit 1622 by making the working distances of the actuators different. Accordingly, the inclination of Bessel beam generated by the Bessel beam generating unit 1624 is also changed, so the position of a Bessel beam to be radiated to the object 1650 can be changed.

The Bessel beam generating unit 1624 can make a Bessel beam on at least a portion of a object 1650, using the electromagnetic wave with the path changed by the path shifting unit 1622. However, it is practically difficult to generate an ideal beam, so the Bessel beams generated by the Bessel beam generating unit 1624 can be considered as a quasi-Bessel beam (QBB).

The straight driving unit 1630 can move straight the first housing 1610.

The rotating unit 1640 can rotate the second housing 1620.

As the straight driving unit 1630 moves straight the first housing 1610 and the rotating unit 1610 rotates the second housing 1620, the probe type detection device 1600 can perform scanning not only in the rotational direction, but the vertical direction.

Figure 17:
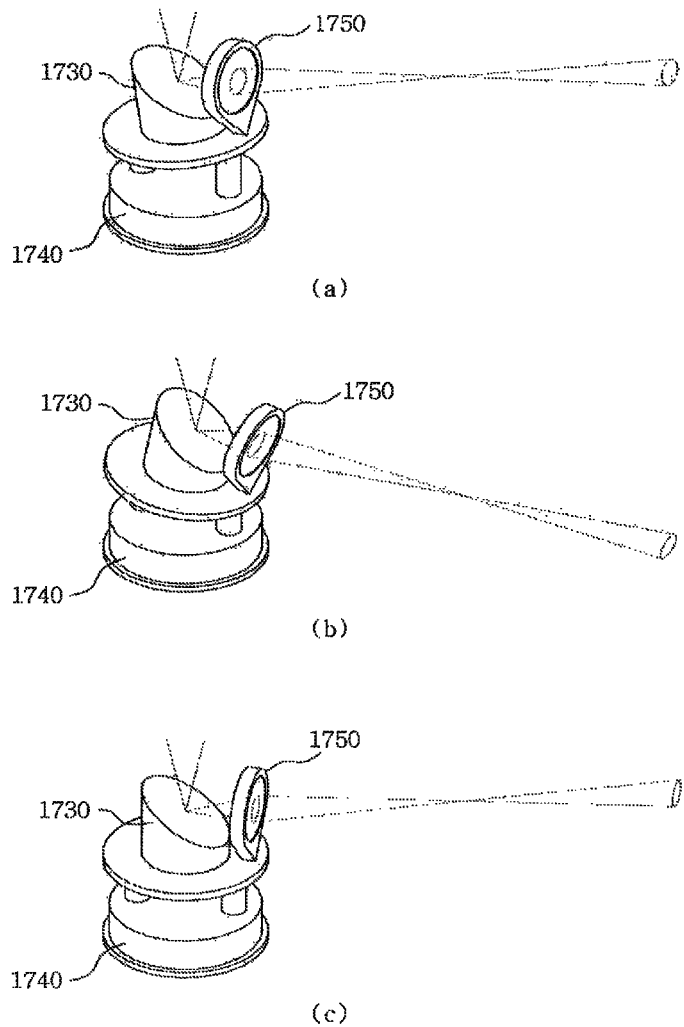
FIG. 17 is a diagram illustrating in detail the path shift driving unit illustrated in FIG. 16.

FIG. 17 is a diagram illustrating in detail the path shift driving unit illustrated in FIG. 16.

Referring to FIG. 17, a path shifting unit 1730 and a Bessel beam generating unit 1750 may be spaced from each other on a plate.

A path shifting driving unit 1740 may include at least two or more actuators. The actuators may be coupled to the lower portion of the plate. By making the lengths of the two actuators different, the inclination of the plate is changed. As the inclination of the plate changes, the inclinations of the path shifting unit 1722 and the Bessel beam generating unit 1750 are changed, so the position of a Bessel beam to be radiated to an object can be changed.

Figure 18A:
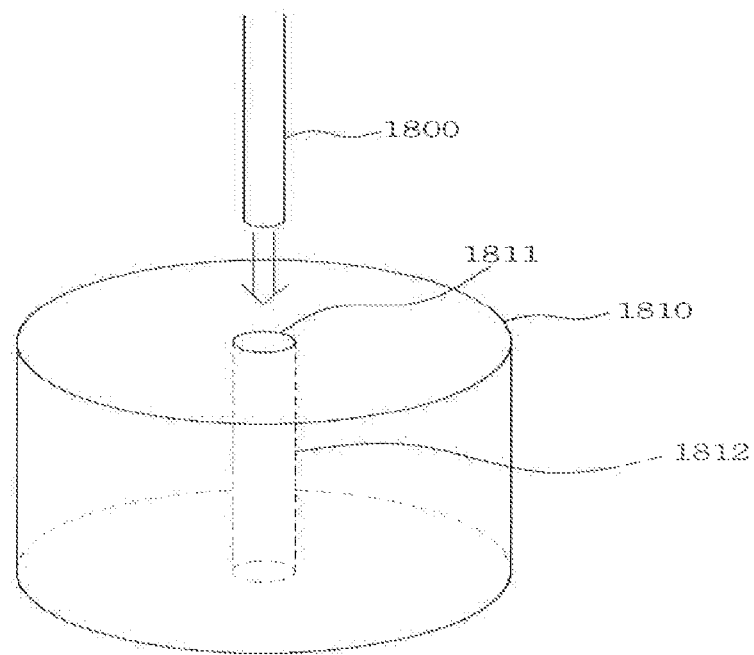
FIGS. 18a, 18b and 18c are diagrams illustrating a process of driving a probe type detection device relating to an embodiment of the present invention.
Figure 18B:
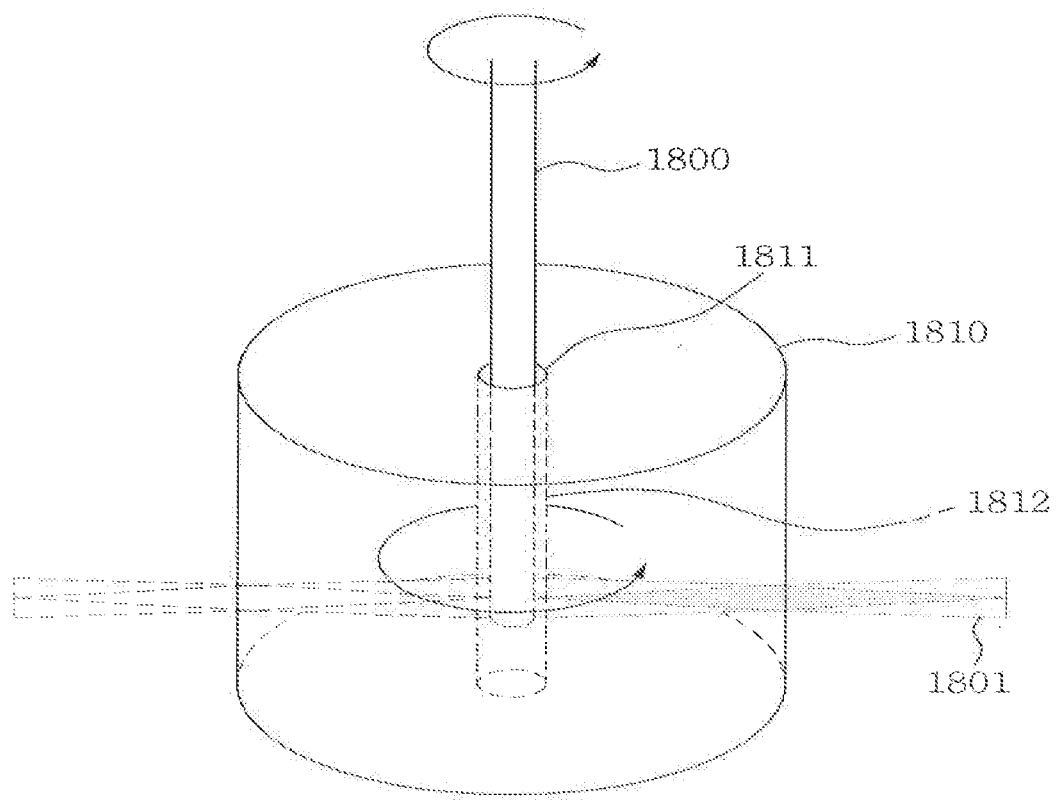
Figure 18C:
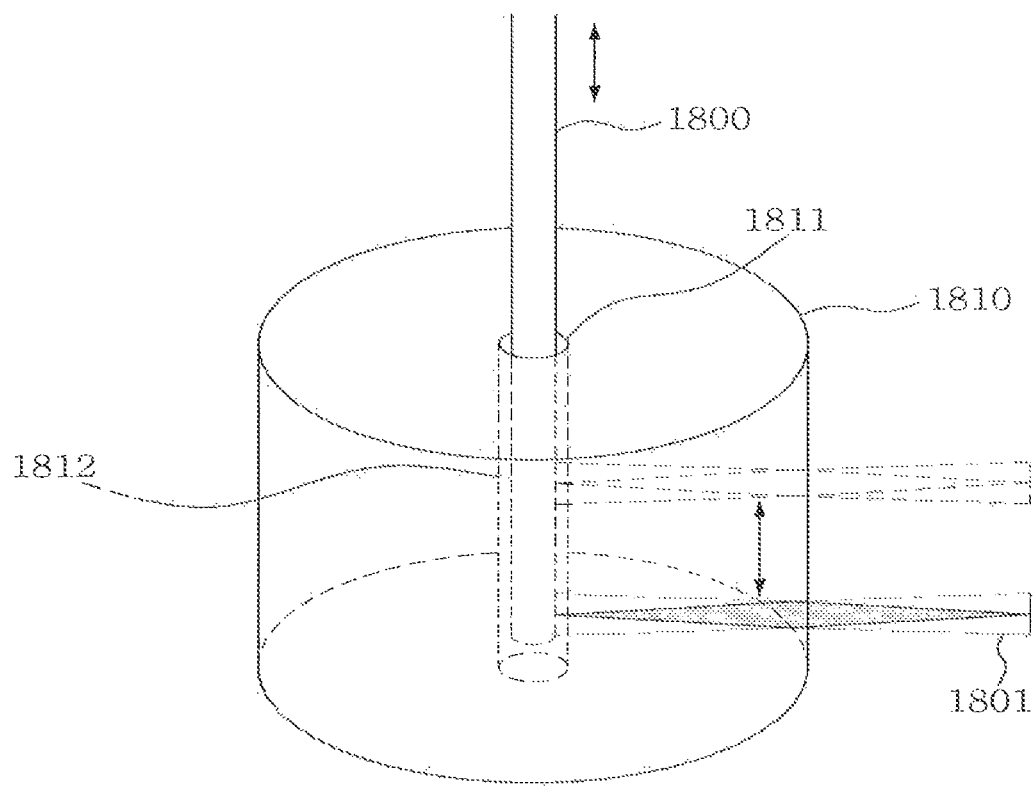

FIGS. 18a and 18c are diagram illustrating a process of driving a probe type detection device relating to an embodiment of the present invention.

Referring to FIG. 18a, a probe type detection device 1800 can be inserted in a receiving unit 1811 included in a cylindrical object 1810 and scan the object 1810.

The receiving portion 1811 may be a through-hole or a groove with a side closed. The outer side of the object may be made of metal and the inner side 1812 of the receiving portion 1811 may be made of a material that can transmit electromagnetic waves well.

Referring to FIG. 18b, when the probe type detection unit 1800 is inserted in the receiving portion 1811 and rotated, a Bessel beam 1801 can scan the object 1810 while rotating.

Referring to FIG. 18c, when the probe type detection unit 1800 is inserted in the receiving portion 1811 and vertically moved, the Bessel beam 1801 can vertically scan the object 1810.

As described above, the probe type detection device can scan an object not only in a rotational direction, but the vertical direction.

The embodiments described above may be partially or fully and selectively combined to make various modifications.

Further, the embodiments are provided only for explaining the present invention and do not limit the present invention. Furthermore, it will be apparent to those skilled in the art that various changes and modifications may be made without departing from the spirit and scope of the invention.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A scanning module comprising:
a first path shifting unit changing a path of an incident electromagnetic wave;
a first driving unit adjusting the path of the electromagnetic wave by moving the first path shifting unit; and
a Bessel beam generating unit making a Bessel beam at least on a portion of an object, using the electromagnetic wave with the path changed by the first path shifting unit;
wherein the first path shifting unit and the Bessel beam generating unit are mechanically combined, and
the Bessel beam generating unit moves integrally with the first path shifting unit, when the first path shifting unit is moved by the first driving unit.

2. The scanning module of claim 1, further comprising an electromagnetic wave adjusting unit being a collimating unit parallelizing electromagnetic waves incident from a light source and sending the parallelized electromagnetic waves into the first path shifting unit.

3. The scanning module of claim 1, further comprising an electromagnetic wave adjusting unit including a collimating unit parallelizing electromagnetic waves incident from a light source and a second reflecting unit reflecting the parallelized electromagnetic waves into the first path shifting unit.

4. The scanning module of claim 1, further comprising an electromagnetic wave adjusting unit including:
a collimating unit parallelizing electromagnetic waves incident from a light source; a second reflecting unit reflecting the parallelized electromagnetic waves; and
a variable optical element moving between the second reflecting unit and the first path shifting unit and sending the reflecting electromagnetic wave into the first path shifting unit.

5. The scanning module of claim 1, wherein the Bessel beam generating unit is composed of a diffractive optical element having a plurality of circular grooves or circular holes, and a lens having a positive refractive index, or is composed of an axicon lens, or is composed of a hologram optical element.

6. The scanning module of claim 1, wherein the distance between the first path shifting unit and the Bessel beam generating unit is adjustable.

7. A scanning module comprising:
a first path shifting unit changing a path of an incident electromagnetic wave;
a first driving unit adjusting the path of the electromagnetic wave by moving the first path shifting unit; and
a Bessel beam generating unit making a Bessel beam at least on a portion of an object, using the electromagnetic wave with the path changed by the first path shifting unit;
wherein the first path shifting unit and the Bessel beam generating unit are spaced from each other, and
the scanning module further includes a second driving unit moving the Bessel beam generating unit so that an electromagnetic wave incident from the first path shifting unit travels into the Bessel beam generating unit when the first path shifting unit is moved by the first driving unit.

8. A scanning module comprising:
a first path shifting unit changing a path of an incident electromagnetic wave;
a first driving unit adjusting the path of the electromagnetic wave by moving the first path shifting; and
a Bessel beam generating unit making a Bessel beam at least on a portion of an object, using the electromagnetic wave with the path changed by the first path shifting unit;
further comprising:
the scanning module further includes a second driving unit moving the Bessel beam generating unit so that an electromagnetic wave incident from the first path shifting unit travels into the Bessel beam generating unit when the first path shifting unit is moved by the first driving unit;
a second path shifting unit disposed between the Bessel beam generating unit and the object, and changing the path of the Bessel beam so that the Bessel beam is formed at least on a portion of the object; and
a third driving unit adjusting the path of the Bessel beam by moving the second path shifting unit.

9. A scanning module comprising:
a first path shifting unit changing a path of an incident electromagnetic wave;
a first driving unit adjusting the path of the electromagnetic wave by moving the first path shifting unit;
a Bessel beam generating unit making a Bessel beam at least on a portion of an object, using the electromagnetic wave with the path changed by the first path shifting unit;
the scanning module further including a second driving unit moving the Bessel beam generating unit so that an electromagnetic wave incident from the first path shifting unit travels into the Bessel beam generating unit when the first path shifting unit is moved by the first driving unit;
a second path shifting unit disposed between the Bessel beam generating unit and the object, and changing the path of the Bessel beam so that the Bessel beam is formed at least on a portion of the object; and
a third driving unit adjusting the path of the Bessel beam by moving the second path shifting unit; and
the first path shifting unit includes:
a body moved by the first driving unit;
a first reflecting unit changing the path of an electromagnetic wave from a light source; and
a fourth driving unit connected to the body at a side and to the first reflecting unit at the other side, and adjusting the path of an electromagnetic wave by moving the first reflecting unit.

10. The scanning module of claim 9, wherein the first path shifting unit and the Bessel beam generating unit are spaced from each other, and
the scanning module further include a second driving unit moving the Bessel beam generating unit so that an electromagnetic wave incident from the first path shifting unit travels perpendicularly to a light incident surface of the Bessel beam generating unit.

11. The scanning module of claim 9, comprising a fifth driving unit moving the variable optical element between the collimating unit and the first path shifting unit.

12. A scanning module comprising: a first path shifting unit changing a path of an incident electromagnetic wave: a first driving unit adjusting the path of the electromagnetic wave by moving the first path shifting unit: and a Bessel beam generating unit making a Bessel beam at least on a portion of an object, using the electromagnetic wave with the path changed by the first path shifting unit: an electromagnetic wave adjusting unit including: a collimating unit parallelizing electromagnetic waves incident from a light source; and a variable optical element moving between the collimating unit and the first path shifting unit and sending the parallelized electromagnetic waves into the first path shifting unit,
    wherein the first path shifting unit and the Bessel beam generating unit are spaced from each other, and the scanning module further includes a second driving unit moving the Bessel beam generating unit so that an electromagnetic wave incident from the first path shifting unit travels perpendicularly to a light incident surface of the Bessel beam generating unit.

13. A detection device using a Bessel beam, comprising:
a first path shifting unit changing a path of an incident electromagnetic wave;
a first driving unit adjusting the path of the electromagnetic wave by moving the first path shifting unit;
a Bessel beam generating unit making a Bessel beam at least on a portion of an object, using the electromagnetic wave with the path changed by the first path shifting unit; and
a detecting unit detecting an intensity of an electromagnetic wave from the object;
wherein the first path shifting unit and the Bessel beam generating unit are spaced from each other, and
the detection device further includes a second driving unit moving the Bessel beam generating unit so that an electromagnetic wave incident from the first path shifting unit travels into the Bessel beam generating unit when the first path shifting unit is moved by the first driving unit.

14. The detection device of claim 13, further comprising a beam splitter reflecting an electromagnetic wave, which is reflected from the object and travels through the Bessel beam generating unit and the first path shifting unit, to the detecting unit,
    wherein the detecting unit detects the intensity of an electromagnetic wave incident from the beam splitter.

15. The detection device of claim 14, further comprising an electromagnetic wave adjusting unit including:
a collimating unit parallelizing electromagnetic waves incident from a light source; and
a variable optical element moving between the collimating unit and the first path shifting unit and sending the parallelized electromagnetic waves into the first path shifting unit.

16. The detection device of claim 13, further comprising a focusing unit focusing electromagnetic waves diverging through the object,
    wherein the detecting unit detects the intensity of electromagnetic waves condensed by the focusing unit.

17. The detection device of claim 16, wherein the focusing unit has a diameter equal to or larger than the diameter of an electromagnetic wave diverging through the object.

18. The detection device of claim 13, wherein the first path shifting unit and the Bessel beam generating unit are mechanically combined, and
    the Bessel beam generating unit moves integrally with the first path shifting unit, when the first path shifting unit is moved by the first driving unit.

19. A detection probe comprising:
a light source generating an electromagnetic wave;
a path shifting unit changing a path so that an electromagnetic wave incident from the light source is radiated to a object;
a detecting unit detecting an intensity of an electromagnetic wave from the object; and
a housing accommodating the light source, the path shifting unit, a Bessel beam generating unit, and the detecting unit;
further comprising:
a waveguide disposed between the light source and the path shifting unit;
a coupling lens sending an electromagnetic wave incident from the light source into the waveguide; and
a focusing lens condensing electromagnetic waves discharged from the waveguide to the path shifting unit.

20. The detection probe of claim 19, further comprising a path shifting driving unit rotating or moving straight the path shifting unit.

21. The detection probe of claim 19, further comprising a Bessel beam generating unit making a Bessel beam at least on a portion of the object, using an electromagnetic wave with the path changed by the path shifting unit.

22. A detection probe comprising:
a light source generating an electromagnetic wave;
a path shifting unit changing a path so that an electromagnetic wave incident from the light source is radiated to a object;
a detecting unit detecting an intensity of an electromagnetic wave from the object; and
a housing accommodating the light source, the path shifting unit, a Bessel beam generating unit, and the detecting unit;
the detection probe further comprising a Bessel beam generating unit making a Bessel beam at least on a portion of the object, using an electromagnetic wave with the path changed by the path shifting unit;
the path shifting unit and the Bessel beam generating unit are mechanically combined; and
the Bessel beam generating unit moves integrally with the path shifting unit when the path shifting unit is moved by the path shifting driving unit.

23. A probe type detection device comprising:
a detection probe including a light source generating an electromagnetic wave, a path shifting unit changing a path so that an electromagnetic wave incident from the light source is radiated to an object, a path shifting driving unit rotating the path shifting unit, a detecting unit detecting an intensity of an electromagnetic wave from the object, and a housing accommodating the fight source, the path shifting unit, the path shifting driving unit, and the detecting unit; and
a straight driving unit moving straight the detection probe;
wherein the detection probe further includes:
a waveguide disposed between the light source and the path shifting unit;
a coupling lens sending an electromagnetic wave incident from the light source into the waveguide; and
a focusing lens condensing electromagnetic waves discharged from the waveguide to the path shifting unit.

24. The probe type detection device of claim 23, wherein the detection probe further includes a Bessel beam generating unit making a Bessel beam at least on a portion of the object, using an electromagnetic wave with the path changed by the path shifting unit.

25. The probe type detection device of claim 23, wherein the path shifting unit and the Bessel beam generating unit are mechanically combined, and
    the Bessel beam generating unit moves integrally with the path shifting unit when the path shifting unit is moved by the path shifting driving unit.

26. A probe type detection device comprising:
a detection probe including a light source generating an electromagnetic wave,
a first housing accommodating a detecting unit detecting an intensity of an electromagnetic wave from an object, a path shifting unit changing a path so that an electromagnetic wave incident from the light source is radiated to the object, and a second housing accommodating a path shifting driving unit rotating the path shifting unit, the first housing having a groove for receiving the second housing, rotary members being disposed at both sides of the groove so that the second housing received in the groove is rotated, and the second housing including a detection probe including coupling portions coupled to the rotary members; and
a straight driving unit moving straight the detection probe;
wherein the detection probe further includes:
a waveguide disposed between the light source and the path shifting unit;
a coupling lens sending an electromagnetic wave incident from the light source into the waveguide; and
a focusing lens condensing electromagnetic wave discharged from the waveguide to the path shifting unit.

* * * * *